US012812013B2

(12) United States Patent

Bartolome Rodrigo et al.

(10) Patent No.: US 12,812,013 B2
(45) Date of Patent: Nov. 24, 2026

(54) SERVICE REQUEST PROCESSING

(71) Applicant: Telefonaktiebolaget LM Ericsson (publ), Stockholm (SE)

(72) Inventors: Maria Cruz Bartolome Rodrigo, Torremocha de Jarama Madrid (ES); Songmao Li, Shanghai (CN); Yunjie Lu, Shanghai (CN); Xinyu Zhang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 18/844,786

(22) PCT Filed: Mar. 3, 2023

(86) PCT No.: PCT/EP2023/055426
§ 371 (c)(1),
(2) Date: Sep. 6, 2024

(87) PCT Pub. No.: WO2023/169948
PCT Pub. Date: Sep. 14, 2023

(65) Prior Publication Data

US 2025/0193286 A1 Jun. 12, 2025

(30) Foreign Application Priority Data

Mar. 9, 2022 (WO) ................ PCT/CN2022/079944

(51) Int. Cl.
*H04L 67/51* (2022.01)
*H04L 67/56* (2022.01)
*H04L 69/24* (2022.01)

(52) U.S. Cl.
CPC .............. *H04L 67/51* (2022.05); *H04L 67/56* (2022.05); *H04L 69/24* (2013.01)

(58) Field of Classification Search
CPC ......... H04L 67/51; H04L 67/56; H04L 69/24; H04W 4/50
See application file for complete search history.

(56) References Cited

U.S. PATENT DOCUMENTS

2022/0295282 A1* 9/2022 Rajput .................... H04W 8/18
2024/0323824 A1* 9/2024 He ........................ H04W 48/16

FOREIGN PATENT DOCUMENTS

EP 3863272 A1 8/2021
WO 2021033074 A1 2/2021
WO 2021083926 A1 5/2021

OTHER PUBLICATIONS

International Search Report and Written Opinion dated Jun. 1, 2023 in International Application No. PCT/EP2023/055426 (7 pages).

(Continued)

*Primary Examiner* — El Hadji M Sall
(74) *Attorney, Agent, or Firm* — Rothwell, Figg, Ernst & Manbeck, P.C.

(57) ABSTRACT

The present disclosure provides methods for processing a service request in a network comprising a set of Network Function (NF) nodes, and corresponding NF nodes. The method performed at a first NF node comprises selecting (S710) an Application Program Interface (API) version for the service based on information on API versions for the service obtained by using a bootstrapping service and stored in the first NF node; constructing (S720) a request for the service using the selected API version; and transmitting (S730) the request to a Service Communication Proxy (SCP). The present disclosure further discloses corresponding methods performed at an SCP and a Network Repository Function (NRF). The present disclosure further provides a corresponding computer readable medium.

9 Claims, 18 Drawing Sheets

(56) References Cited

OTHER PUBLICATIONS

3GPP TS 23.501 V17.3.0 (Dec. 2021), Technical Specification, 3rd Generation Partnership Project; Technical Specification Group Services and System Aspects; System architecture for the 5G System (5GS); Stage 2 (Release 17) (559 pages).
3GPP TS 29.501 V17.4.1 (Dec. 2021), Technical Specification, 3rd Generation Partnership Project; Technical Specification Group Core Network and Terminals; 5G System; Principles and Guidelines for Services Definition; Stage 3 (Release 17) (80 pages).
3GPP TS 29.510 V17.4.0 (Dec. 2021), Technical Specification, 3rd Generation Partnership Project; Technical Specification Group Core Network and Terminals; 5G System; Network Function Repository Services; Stage 3 (Release 17) (284 pages).

* cited by examiner

SERVICE REQUEST PROCESSING

TECHNICAL FIELD

The present disclosure generally relates to the technical field of telecommunication, and particularly to methods and Network Function (NF) nodes for processing a service request in a network comprising a set of NF nodes, and a corresponding computer readable medium.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Fifth Generation (5G) networks, a Network Slice is introduced as a logical network that provides specific network capabilities and network characteristics. An instance of a network slice (e.g. a network slice instance (NSI)) is a set of Network Function (NF) instances and the required resources (e.g., computing, storage, and networking resources) which form a deployed Network Slice. An NF is a third generation partnership project (3GPP) adopted or 3GPP defined processing function in a network, which has defined functional behavior and 3GPP defined interfaces. An NF can be implemented either as a network element on dedicated hardware, a software instance running on a dedicated hardware, or as a virtualized function instantiated on an appropriate platform, e.g., on a cloud infrastructure.

Among the NFs, a Service Communication Proxy (SCP) is defined, which provides centralized capabilities such as Service Based Interface (SBI) routing, NF discovery and selection, failover, message screening, etc. An SCP is used in indirect routing scenarios and one of the options to deploy SCP is model D, as described in 3GPP technical standard (TS) 23.501 (see, for example, annex E of 3GPP TS 23.501).

FIG. 1 shows a communication model for NF/NF services interaction in model D as described in 3GPP TS 23.501.

As per the service definition in 3GPP 23.501, Model D can be defined as—indirect communication with delegated discovery. That is, NF service consumers do not do (perform) any discovery or selection. The consumer adds any necessary discovery and selection parameters required to find a suitable producer to a service request. The SCP uses a request address and the discovery and selection parameters in a request message to route the request to a suitable producer instance. The SCP can perform discovery with a Network Repository Function (NRF) and obtain a discovery result.

In this model, the SCP discovers the target NF service producer. As per the service definition in 3GPP 23.501, if indirect communication with delegated discovery is used, the NF service consumer sends the request to the SCP and provides, within the service request to the SCP, the discovery and selection parameters necessary to discover and select an NF service producer.

Moreover, it is indicated in 3GPP TS 29.501 that an Application Program Interface (API) version is part of a resource Uniform Resource Identifier (URI). Clause 4.3.1.3 of 3GPP TS 29.501 relates to the visibility of the API version number fields. The API version can be indicated in the resource URI of every API, as described in clause 4.4.1 of 3GPP TS 29.501. The API version can be indicated as the concatenation of the letter "v" and the 1st field of the API version number. The other fields may not be included in the resource URI. Including these digits in the URI can force the NF service consumer to select a specific sub-version, at the risk of seeing the request rejected if the NF service provider does not support it, while the request may have been served by ignoring unknown elements.

Clause 4.4.1 of 3GPP TS 29.501 relates to a resource URI structure. Resources are either individual resources, or structured resources that can contain child resources. It is commonly recommended to design each resource following one of the archetypes provided in Annex C of 3GPP TS 29.501. A URI uniquely identifies a resource. In the 5G core (5GC) SBI APIs, when a resource URI is an absolute URI, its structure shall be specified as follows:

{apiRoot}/<apiName>/<apiVersion>/<apiSpecificResourceUriPart>

"apiName" defines the name of the API and "apiVersion" indicates the 1st Field (MAJOR) of the version of the API (see, for example, clause 4.3.1.33 and 4.4.1 of 3GPP TS 29.501. In clause 4.3.1.1 of 3GPP TS 29.501, an API version number format is also indicated. API version numbers can consist of at least 3 fields, following a MAJOR.MINOR.PATCH pattern (for example, according to the Semantic Versioning Specification).

Two versions that differ in the major field or even in the minor field can have backward incompatible changes.

There is an issue when there are NFs deployed with different versions that are non-backward-compatible (NBC) or where there are NFs deployed with NBC versions among them. Even though NBC versions are usually minimized, it will be common that, for each API, NBC versions arise. There are already some cases such as, for example, a Policy Control Function ( ) API.

With indirect communication with delegated discovery (model D), an NF service consumer does not perform NRF discovery to get (acquire) the profiles of NF service producers. Instead, this discovery is delegated to the SCP. When the NF service consumer receives an error response from the SCP for a service request, it does not know the failure reason, and thus cannot retry a service request by addressing the failure.

SUMMARY

At least some objects of the present disclosure are to provide technical solutions capable of allowing NF service consumers to be aware of available API versions for a service request and retry a service request if it supports multiple NF service producer NBC API versions.

According to a first aspect of the present disclosure, there is provided a method performed at a first network function (NF) node for requesting a service with a service communication proxy (SCP). The method comprises selecting an API version for the service based on information on API versions for the service obtained by using a bootstrapping service and stored in the first NF node; constructing a request for the service using the selected API version; and transmitting the request to the SCP.

In an exemplary embodiment, the method may further comprise transmitting a bootstrapping request to a network repository function (NRF) for bootstrapping information which comprises information on services and API versions supported by the services; in response to transmitting the bootstrapping request, receiving from the NRF the bootstrapping information; and storing the information on services and API versions supported by the services.

In an exemplary embodiment, the bootstrapping request may be a dedicated bootstrapping request for obtaining the information on services and API versions supported by the services.

In an exemplary embodiment, the information on services and API versions supported by the services may further comprise information on NF nodes that support the API versions of the services.

In an exemplary embodiment, the services and API versions supported by the services may be global services and API versions supported by the services.

In an exemplary embodiment, the method may further comprise receiving, from the SCP, a response indicating an error; in response to the receiving of the response, reselecting a different API version for the service based on the information on API versions for the service; constructing a different request for the service using the reselected API version; and transmitting the different request to the SCP.

In an exemplary embodiment, transmitting the bootstrapping request to the NRF for bootstrapping information may be performed at a power-on event at the first NF node, regularly, or in response to receiving a response indicating an error from the SCP.

According to a second aspect of the present disclosure, there is provided a method performed at an NRF. The method comprises receiving a bootstrapping request from a first NF node for bootstrapping information which comprises information on services and API versions supported by the services; and in response to receiving the bootstrapping request, transmitting to the first NF node the bootstrapping information.

In an exemplary embodiment, the bootstrapping request may be a dedicated bootstrapping request for obtaining the information on services and API versions supported by the services In an exemplary embodiment, the information on services and API versions supported by the services may further comprise information on NF nodes that support the API versions of the services.

In an exemplary embodiment, the method may further comprise, in response to receiving the bootstrapping request, collecting global services and API versions supported by the services from at least another NRF.

According to a third aspect of the present disclosure, there is provided a method performed at an SCP. The method comprises receiving a request for a service from a first NF node; extracting an API version from a Resource URI in the request; transmitting to an NRF an NF discovery request for discovering a second NF node that provides the service without a limitation on the API version; and filtering a second NF node that provides the service of the extracted API version from an NF discovery response from the NRF using the extracted API version.

According to a fourth aspect of the present disclosure, a first NF node is provided. The first NF node comprises at least one processor configured to operate in accordance with the above-described first aspect. In some embodiments, the first NF node may comprise a communication interface arranged for communication. In some embodiments, the first NF node may comprise a memory comprising instructions which, when executed by the at least one processor, cause the first NF node to perform the above-described first aspect.

According to a fifth aspect of the present disclosure, an NRF is provided. The NRF comprises at least one processor configured to operate in accordance with the above-described second aspect. In some embodiments, the NRF may comprise a communication interface arranged for communication. In some embodiments, the NRF may comprise a memory comprising instructions which, when executed by the at least one processor, cause the NRF to perform the above-described second aspect.

According to a sixth aspect of the present disclosure, an SCP is provided. The SCP comprises at least one processor configured to operate in accordance with the above-described third aspect. In some embodiments, the SCP may comprise a communication interface arranged for communication. In some embodiments, the SCP may comprise a memory comprising instructions which, when executed by the at least one processor, cause the SCP to perform the above-described third aspect.

According to a seventh aspect of the present disclosure, there is provided a computer program comprising instructions which, when executed by at least one processor, cause the at least one processor to perform the method according to the above-described first aspect, second aspect, and/or third aspect.

According to an eighth aspect of the present disclosure, there is provided a carrier containing the computer program discussed above. In some embodiments, the carrier may be one of an electronic signal, optical signal, radio signal, or computer readable storage medium.

According to a ninth aspect of the present disclosure, there is provided a computer readable storage medium having computer program instructions stored thereon, the computer program instructions, when executed by at least one processor, causing the processor to perform the method according to the above-described first aspect, second aspect, and/or third aspect.

According to the above technical solutions of the present disclosure, the NF service consumer may have knowledge on available API versions, and select an appropriate API version in constructing the service request, thereby enhancing the possibility of successfully processing the service request. When the NF service consumer receives an error response from the SCP, it may select a different API version based on the knowledge on available API version. Therefore, there is provided herein a solution to support multiple NF service producer NBC API versions with indirect communication, e.g. with model D.

BRIEF DESCRIPTION OF THE DRAWINGS

The objects, advantages and characteristics of the present disclosure will be more apparent, according to descriptions of preferred embodiments in connection with the drawings, in which.

Figure 1:
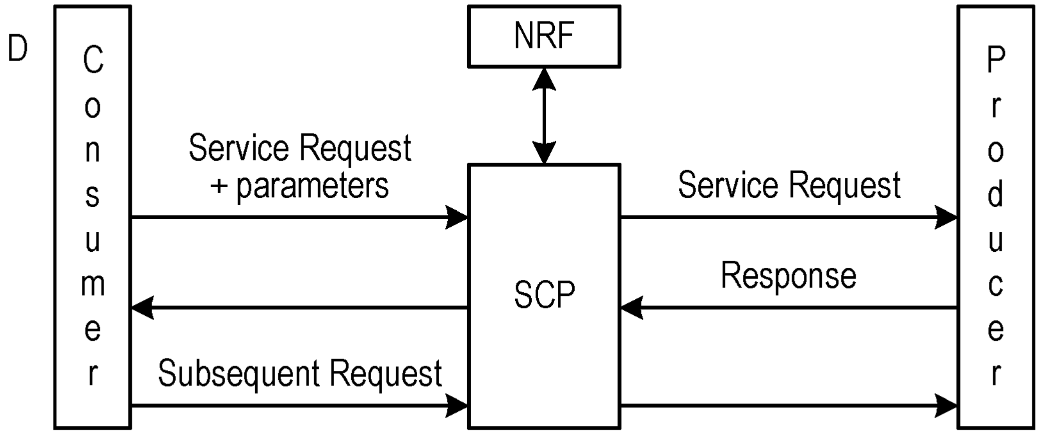
FIG. 1 shows a communication model for NF/NF services interaction in model D.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings.

Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in references as follows:

1) 3GPP TS 23.501, V17.3.0 (2021 December),
2) 3GPP TS 29.501, V17.4.1 (2021 December), and
3) 3GPP TS 29.510, V17.4.0 (2021 December).

References in this specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of the person skilled in the art to affect such feature, structure, or characteristic in connection with other embodiments whether or not explicitly described.

The terminology used herein is for the purpose of describing particular embodiments only and is not intended to be limiting of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), Long Term Evolution (LTE), New Radio (NR) and other networks developed in the future. The terms "network" and "system" are sometimes used interchangeably. For illustration only, certain aspects of the techniques are described below for the $5^{th}$ generation of wireless communication network. However, it will be appreciated by the person skilled in the art that the techniques described herein may also be used for other wireless networks such as LTE and corresponding radio technologies mentioned herein as well as wireless networks and radio technologies proposed in the future.

As used herein, the term "UE" may be, by way of example and not limitation, a User Equipment (UE), a SS (Subscriber Station), a Portable Subscriber Station (PSS), a Mobile Station (MS), a Mobile Terminal (MT) or an Access Terminal (AT). The UE may include, but is not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "UE", "terminal device", "mobile terminal" and "user equipment" may be used interchangeably.

Figure 2:
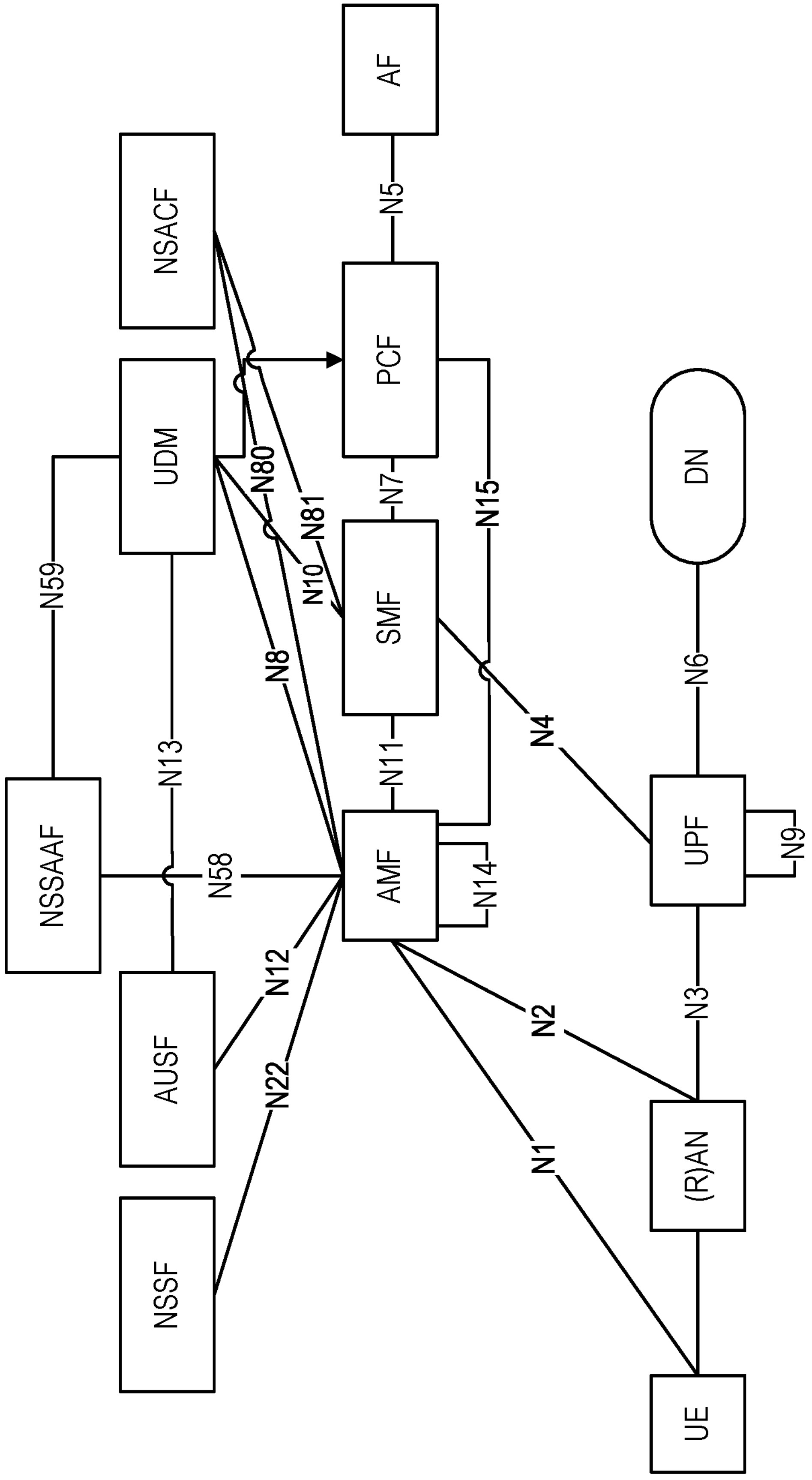
FIG. 2 illustrates a wireless communication system represented as a 5G network architecture composed of core NFs.

FIG. 2 illustrates a wireless communication system represented as a 5G network architecture composed of core NFs, where interaction between any two NFs is represented by a point-to-point reference point/interface.

Seen from the access side, the 5G network architecture shown in FIG. 2 comprises a plurality of User Equipment (UEs) connected to either a Radio Access Network (RAN) or an Access Network (AN) directly, as well as an Access and Mobility Management Function (AMF) indirectly, for example, via the RAN or AN. Typically, the R (AN) comprises base stations, e.g. such as evolved Node Bs (eNBs), or 5G base stations (gNBs), or similar. Seen from the core network side, the 5G core NFs shown in FIG. 2 include a Network Slice-specific and Stand-alone Non-Public Network (SNPN) Authentication and Authorization Function (NSSAAF), a Network Slice Selection Function (NSSF), an Authentication Server Function (AUSF), a Unified Data Management (UDM), a Network Slice Admission Control Function (NSACF), an Access and Mobility Management Function (AMF), a Session Management Function (SMF), a Policy Control Function (PCF), an Application Function (AF), and a User Plane Function (UPF).

Reference point representations of the 5G network architecture are used to develop detailed call flows in the normative standardization. The N1 reference point is defined to carry signaling between the UE and the AMF. The reference points for connecting between the AN and the AMF and between the AN and the UPF, are defined as N2 and N3, respectively. There is a reference point, N11, between the AMF and SMF, which implies that the SMF is at least partly controlled by the AMF. N4 is used by the SMF and the UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and the SMF, respectively. N12 is required for the AMF to perform authentication of the UE. N8 and N10 are defined because the subscription data of the UE is required for the AMF and the SMF.

The 5G core network aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and the SMF are independent functions in the control plane. Separated the AMF and the SMF allow independent evolution and scaling. Other control plane functions like the PCF and the AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
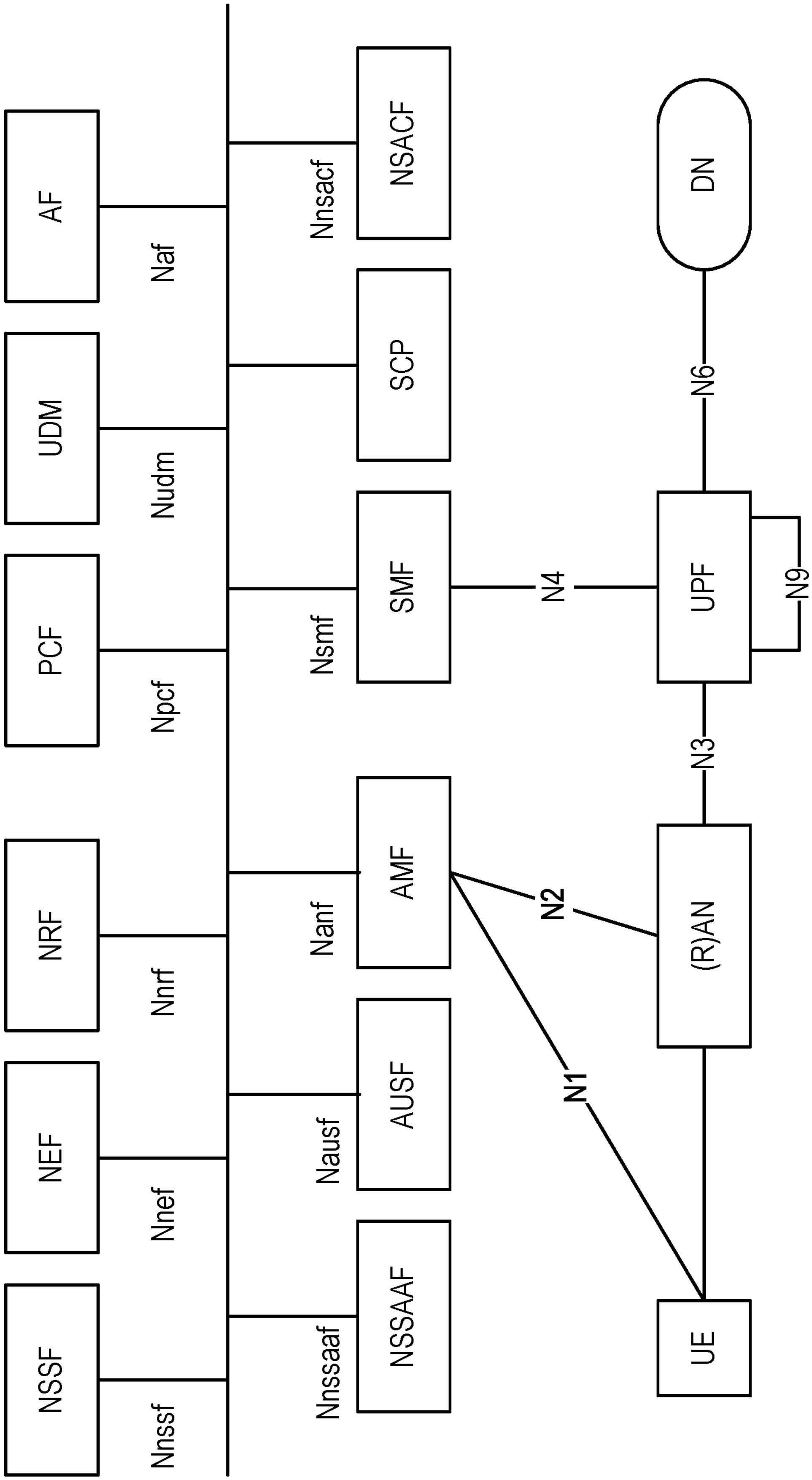
FIG. 3 illustrates a 5G network architecture using service-based interfaces between the NFs in a control plane, instead of point-to-point reference points/interfaces as used in the 5G network architecture illustrated in FIG. 2.

FIG. 3 illustrates a 5G network architecture using service-based interfaces between the NFs in the control plane, instead of the point-to-point reference points/interfaces used in the 5G network architecture as illustrated in FIG. 2. However, the NFs described above with reference to FIG. 2 correspond to the NFs shown in FIG. 3. The service(s) etc. that an NF provides to other authorized NFs can be exposed to the authorized NFs through the service-based interface(s). In FIG. 3 the service-based interfaces are indicated by the letter "N" followed by the name of the NF, e.g. Namf for the service-based interface of the AMF, and Nsmf for the service-based interface of the SMF etc.

Some properties of the NFs shown in FIGS. 2-3 may be described in the following manner. The AMF provides UE-based authentication, authorization, mobility management, etc. A UE using multiple access technologies is basically connected to a single AMF because the AMF is independent of the access technologies. The SMF is responsible for session management and allocates internet protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and the SMF operate properly. The AUSF supports authentication function for UEs, or similar, and thus stores data for authentication of UEs, or similar, while the UDM stores subscription data of the UE. The Data Network (DN), not part of the 5G core network, provides Internet access or operator services and similar.

An NF may be implemented either as a network element on a dedicated hardware, as a software instance running on a generic hardware, or as a virtualized function instantiated on an appropriate platform, e.g., a cloud infrastructure. An SCP can be defined as a node that is configured to operate as an SCP between NF nodes, e.g. the first NF node (e.g. an NF service consumer node) referred to herein and any one or more second NF nodes (e.g. any one or more NF service producer nodes) referred to herein.

If an SCP is deployed, it can be used for indirect communication between NF service producers and NF service consumers. The SCP does not expose services itself.

If indirect communication with delegated discovery ("model D") is used, the NF service consumer sends the service request to the SCP and provides, within the service request to the SCP, the discovery and selection parameters necessary to discover and select an NF service producer. Thus, in model D, the SCP is operable or configured to perform (or is responsible for performing) NF discovery. The discovery can be referred to as delegated discovery as it can be delegated to the SCP, e.g. by the NF service consumer. For example, in model D, the NF service consumer can send, to the SCP, one or more discovery parameters (or factors) required to find one or more (suitable) NF service producer nodes. The SCP may discover one or more NF service producer nodes (e.g. via an NRF or from its own cache) by using the received one or more discovery parameters.

There is an issue when there are NF service producers deployed with different versions that are non-backward-compatible (NBC) or where there are NFs deployed with NBC versions among them.

Version numbering defines so called minor and major version, e.g. 1.2.0, where 1 is the major version, and 2 is the minor one. A different major version can have NBC changes, but this may happen as well for minor versions.

In NRF discovery, it is possible to include a query parameter "preferred-supported-features". This query parameter is defined in 3GPP TS 29.510 see Table 1 below, which corresponds to Table 6.2.3.2.3.1-1 of 3GPP TS 29.510).

TABLE 1

URI query parameters supported by a GET method on this resource

| Name | Data type | P | Cardinality | Description | Applicability |
|---|---|---|---|---|---|
| . . . | . . . | . . . | . . . | . . . | . . . |
| preferred-api-versions | map(string) | O | 1 . . . N | When present, this information element (IE) indicates a preferred API version of services that are supported by the target NF instances. The key of the map is the ServiceName (see clause 6.1.6.3.11 of 3GPP TS 29.510) for which the preferred API version is indicated. Each element carries the API Version Indication for the service indicated by the key. The NRF may return additional NFs in the response not matching the preferred API versions, e.g. if no NF profile is found matching the preferred-api-versions.<br>An API Version Indication is a string formatted as {operator} + {API Version}.<br>The following operators shall be supported:<br>“=” match a version equals to the version value indicated.<br>“>” match any version greater than the version value indicated<br>“>=” match any version greater than or equal to the version value indicated<br>“<” match any version less than the version value indicated<br>“<=” match any version less than or equal to the version value indicated<br>“^” match any version compatible with the version indicated, i.e. any version with the same major version as the version indicated.<br>Precedence between versions is identified by comparing Major, Minor, and Patch version fields numerically, from left to right.<br>If no operator or an unknown operator is provided in API Version Indication, “=” operator is applied.<br>Example of API Version Indication:<br>Case1: “=1.2.4.operator-ext” or “1.2.4.operator-ext” means matching the service with API version “1.2.4.operator-ext”<br>Case2: “>1.2.4” means matching the service with API versions greater than “1.2.4”<br>Case3: “^2.3.0” or “^2” means matching the service with all API versions with major version “2”. | Query-Params-Ext2 |

However, the (discovery) results may include “non-preferred api versions”. If only “preferred-api-versions” are included in the (discovery) results, it can be indicated that the result includes the attribute “preferredSearch”, as described in clause 6.2.6.2.2 of 3GPP TS 29.510 (see Table 2 below, which corresponds to Table 6.2.6.2.2-1 of 3GPP TS 29.510).

TABLE 2

Definition of type SearchResult

| Attribute name | Data type | P | Cardinality | Description |
|---|---|---|---|---|
| . . . | . . . | . . . | . . . | . . . |
| preferredSearch | PreferredSearch | C | 0 . . . 1 | This IE shall be present to indicate whether all the returned NFProfiles match the preferred query parameters, if the discovery request contain any of the query parameter defined in the PreferredSearch data type. |

Where PreferredSearch can be as follows (see Table 3 below, which corresponds to Table 6.2.6.2.6-1 of 3GPP TS 29.510):

TABLE 3

Definition of type PreferredSearch

| Attribute name | Data type | P | Cardinality | Description |
|---|---|---|---|---|
| . . . | | | | |
| preferredApiVersionsMatchInd | boolean | O | 0 . . . 1 | Indicates whether the search result includes at least one NF Profile that matches all the preferred API versions indicated in the query parameter preferred-api-versions.<br>true: Match<br>false: Not Match |
| otherApiVersionsInd | boolean | O | 0 . . . 1 | This IE may be present if the preferred-api-versions query parameter is provided in the discovery request. When present, this IE indicates whether there is at least one NF Profile with other API versions, i.e. that does not match all the preferred API versions indicated in the preferred-api-versions, returned in the response or not.<br>true: Returned<br>false: Not returned |

Then, even with this information, a client is only able to know whether only preferred-api-versions are included in the NF service producer profiles provided, or if other non-preferred API-versions may be included as well. But it is up to NRF implementation in fact to provide NF service producer profiles with a non-preferred-apiversion.

With this information, if the client is an NF service consumer, unless it is indicated that only NF service producers with preferred-api-versions are provided, the NF service consumer needs to check the api-version in the NF service producer profiles to select the preferred api-version, among the ones provided. Then, the NF service consumer may encode a JavaScript Object Notation (JSON) body in the service request according to the version chosen.

With indirect communication with delegated discovery (model D), the NF service consumer does not perform NRF discovery to get the NF service producer profiles. Instead, this is delegated to the SCP. Some of the following description and figures describe the issues in this case.

There are some variants of existing behaviour, which depend on if a preferred-api-versions query parameter is used and if the NF service producer supports the major versions indicated by the resource URI.

Figure 4:
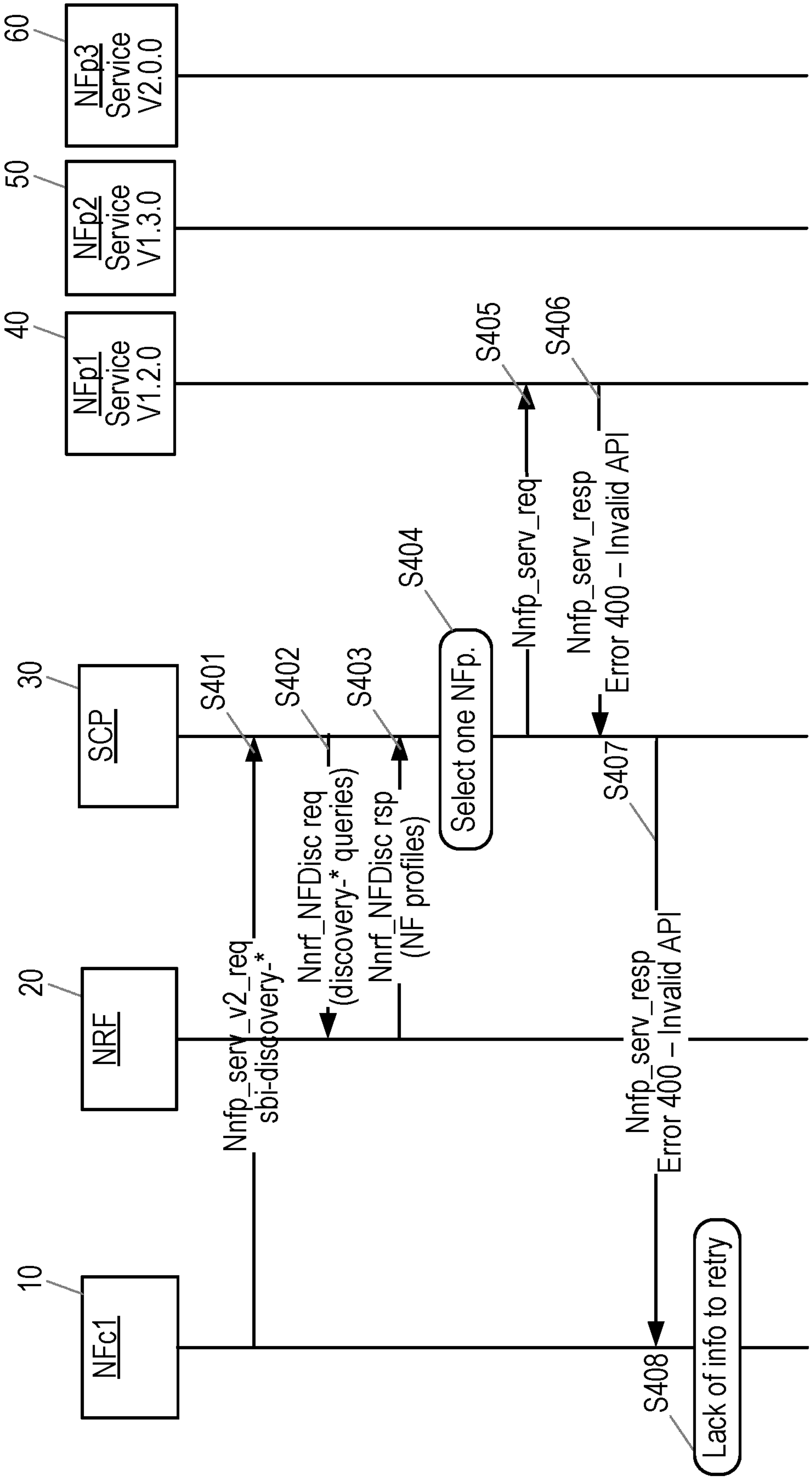
FIG. 4 shows an exemplifying signaling diagram illustrating details of a flow where an NF node makes a request for a service in model D, in which a preferred-api-versions query parameter is not used.

FIG. 4 shows an exemplifying signaling diagram illustrating details of a flow where an NF node, (e.g., an NF service consumer) requests a service in model D, in which a preferred-api-versions query parameter is not used.

The example shown in FIG. 4 involves an NFc1 10, which is an NF service consumer, an NRF 20, an SCP 30, and NF service producers 40, 50, 60 (i.e. NFp1 40, NFp2 50, and NFp3 60). In the example illustrated in FIG. 4, NFp1 40 provides v1.2.0 of the service, NFp2 50 provides v1.3.0 of the service, and NFp3 60 provides v2.0.0 of the service. FIG. 4 is only an example, and it is known that the number of the NF service producers and the services provided by the NF service producers are shown only for illustration, and that other numbers of NF service producers and/or services is possible.

When a service consumer entity, for example NFc1 10, requests the SCP 30 for a service, it may transmit a service request (i.e. a request for a service), e.g. “Nnfp_serv_v2_req”, to the SCP 30 in step S401 of FIG. 4. Thus, the SCP 30 can receive the service request from the NFc1 10. The API-version is included in the ResourceURI as standardized, e.g. v2 in the example illustrated in FIG. 4. In the example illustrated in FIG. 4, sbi-discovery-* does not include sbi-discovery-preferred-apiversions.

In step S402 of FIG. 4, the SCP 30 may transmit a discovery request, e.g. “Nnrf_NFDisc req”, to the NRF 20, to find the corresponding NF service producer profiles. Thus, the NRF 20 can receive the discovery request from the SCP 30.

In step S403 of FIG. 4, the NRF 20 can provide all available NF service producer instances 40, 50, 60, i.e., NFp1 40, NFp2 50 and NFp3 60. Thus, the SCP 30 can receive all available NF service producer instances 40, 50, 60 (NRF discovered results) from the NRF 20.

In step S404 of FIG. 4, the SCP 30 may select one NF service producer 40 from NRF discovered results. The SCP 30 may select an NF service producer that does not support the required version, e.g. NFp1 40 in the example.

In step S405 of FIG. 4, the SCP 30 may transmit the service request to the selected NF service producer 40, i.e., NFp1 40. Thus, NFp1 40 can receive the service request from the SCP 30.

In the example illustrated in FIG. 4, NFp1 40 is unable to process the request, since this version of the API is not supported. Accordingly, in step S406 of FIG. 4, the SCP 30 can receive a response from NFp1 40, including an error.

The SCP 30 is unable to solve the situation, since the resource URI is constructed based on API-version v2. The SCP 30 cannot modify the resource URI. So, the SCP 30 may forward the error response to the NFc1 in step S407 of FIG. 4.

NFc1 10 can thus receive the error response from the SCP 30, but has no knowledge of the information to retry. Accordingly, in step S408, NFc1 10 is unable to retry or to react upon this error by any means. In the example illustrated in FIG. 4, since the NF service consumer (i.e. NFc1 10) in model D does not perform NRF discovery, the request sent to the SCP 30 just fails.

Figure 5:
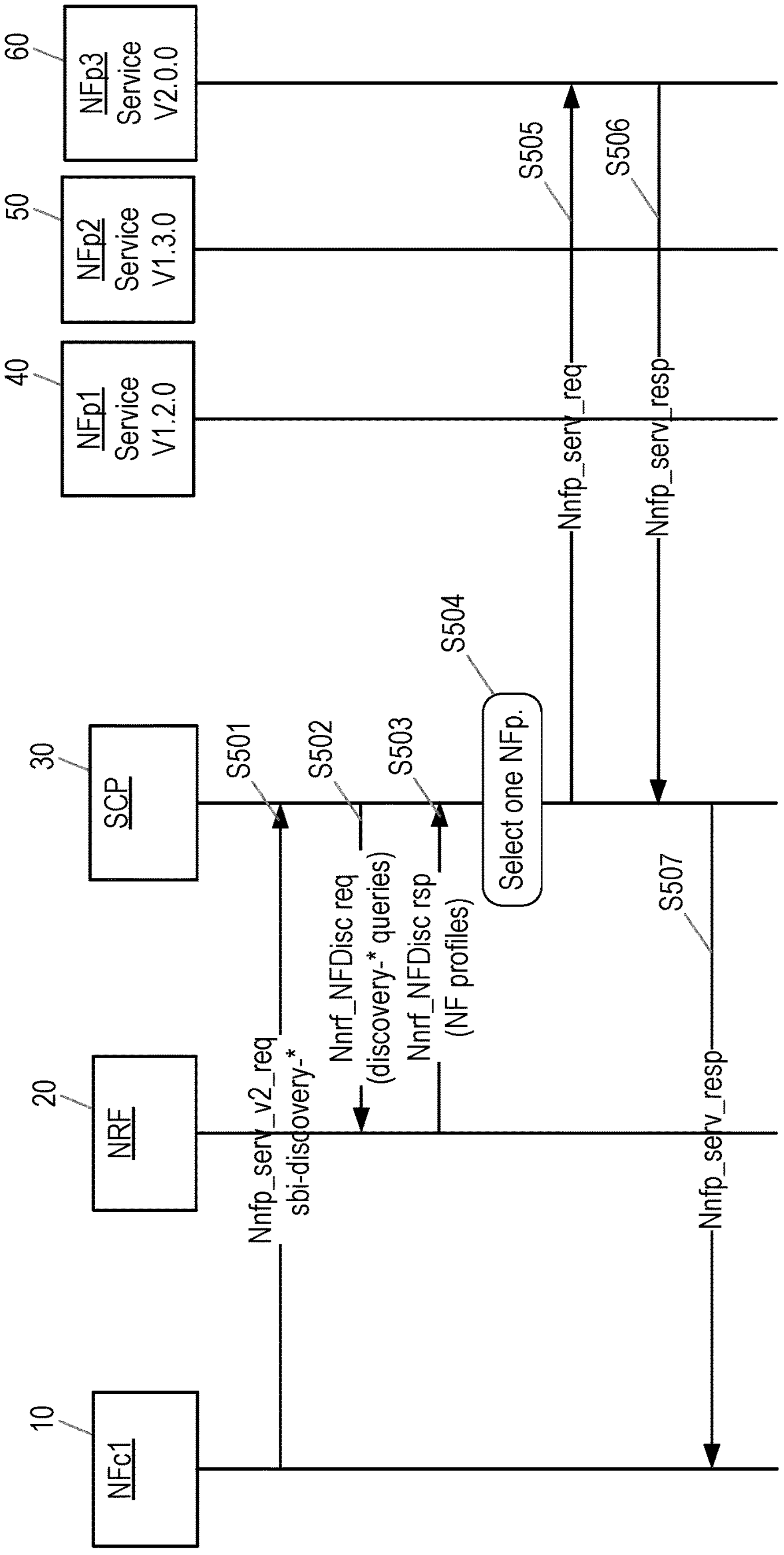
FIG. 5 shows an exemplifying signaling diagram illustrating details of a flow where an NF node makes a request for a service in model D, in which a preferred-api-versions query parameter is used and there is an available NF service producer supporting major versions indicated by a resource URI.

FIG. 5 shows an exemplifying signaling diagram illustrating details of a flow where an NF node, (e.g., an NF service consumer) requests a service in model D, in which preferred-api-versions query parameter is used and there is an available NF service producer supporting the major versions indicated by the resource URI.

The example shown in FIG. 5 involves an NFc1 10, which is an NF service consumer, an NRF 20, an SCP 30, and NF service producers 40, 50, 60 (i.e. NFp1 40, NFp2 50, and NFp3 60). In the example illustrated in FIG. 5, NFp1 40 provides v1.2.0 of the service, NFp2 50 provides v1.3.0 of the service, and NFp3 60 provides v2.0.0 of the service. FIG. 5 is only an example, and it is known that the number of the NF service producers and the services provided by the NF service producers are shown only for illustration, and that other numbers of NF service producers and/or services is possible.

When a service consumer entity, for example NFc1 10, requests the SCP 30 for a service, it may transmit a service request (i.e. a request for a service), e.g. “Nnfp_serv_v2_req”, to the SCP 30 in step S501 of FIG. 5. Thus, the SCP 30 can receive the service request from the NFc1 10. The API-version is included in the ResourceURI as standardized, e.g. v2 in the example illustrated in FIG. 5. In the example illustrated in FIG. 5, sbi-discovery-* includes an sbi-discovery-preferred-apiversions header, e.g. ^2, which means matching the service with all API versions with major version “2”.

In step S502 of FIG. 5, the SCP 30 may transmit a discovery request, e.g. “Nnrf_NFDisc req”, to the NRF 20, to find the corresponding NF service producer profiles. Thus, the NRF 20 can receive the discovery request from the SCP 30. The “sbi-discovery-preferred-apiversions” header can be included in the discovery request as a query parameter for the NRF discovery.

In step S503 of FIG. 5, the NRF 20 may provide a discovery response to the SCP 30. Thus, the SCP 30 can receive the discovery response from the NRF 20. For example, the NRF 20 may provide only an exact match for API-version with major version “2”, or include other profiles as well. This is unknown.

In step S504 of FIG. 5, the SCP 30 may select one NF service producer from NRF discovered results. There may be different possible variants of behaviour depending on the NRF and SCP behaviour, for example:

Variant a): Assume other non-preferred-apiversion profiles are included as well as discovery results, and this is indicated to the SCP 30. Then, the SCP 30 may choose any random profile from the results, e.g. NFp1 40, the same flow as in FIG. 4. In this case, steps S405 to S408 of FIG. 4 may be reproduced.

Variant b): Only exact match results are provided from the NRF 20. In this case, only NFp3 60 is provided from the NRF 20 (since NFp3 supports the required version (i.e. major version “2”)). The SCP 30 may then select NFp3 60.

In step S505 of FIG. 5, the SCP 30 can transmit the service request to the selected NF service producer, i.e., NFp3 60. Thus, NFp3 60 can receive the service request from the SCP 30.

In the example illustrated in FIG. 5, NFp3 60 is able to process the request. Accordingly, in step S506 of FIG. 5, the SCP 30 can receive a service response from NFp3 60, indicating successful processing of the service request.

The SCP 30 can forward the successful service response to the NFc1 10, in step S507 of FIG. 5. Thus, NFc1 10 can receive the successful service response from the SCP 30.

Therefore, an issue is that, in some cases, the request may not be able to be executed. This depends on the NRF behaviour, which is unknown.

In 3GPP TS 29.510, the services offered by the NRF are defined that as follows:

“5 Services Offered by the NRF 5.1 Introduction

The NRF offers to other NFs the following services:

Nnrf_NFManagement

Nnrf_NFDiscovery

Nnrf_AccessToken (OAuth2 Authorization)

Nnrf_Bootstrapping”

As for the Nnrf_Bootstrapping service, it is defined in 3GPP TS 29.510 as follows:

“5.5Nnrf_Bootstrapping Service 5.5.1 Service Description

The NRF offers a Nnrf_Bootstrapping service to let NF Service Consumers of the NRF know about the services endpoints it supports, by using a version-independent URI endpoint that does not need to be discovered by using a Discovery service.

This service shall be used in inter-PLMN scenarios where the NRF in a PLMN-A needs to invoke services from an NRF in PLMN-B, when there is no pre-configured information indicating the version of the services deployed in PLMN-B.

This service may also be used in intra-PLMN scenarios, to avoid configuring statically in the different NFs information about the service versions deployed in the NRF to be used by those NFs.

5.5.2 Service Operations 5.5.2.1 Introduction

The services operations defined for the Nnrf_Bootstrapping service are as follows:

Nnrf_Bootstrapping_Get 5.5.2.2 Get 5.5.2.2.1 General

This service operation is used by an NF Service Consumer to request bootstrapping information from the NRF.

. . .

1. The NF Service Consumer shall send a GET request to the "Bootstrapping Endpoint".

The "Bootstrapping Endpoint" URI shall be constructed as:

{nrfApiRoot}/bootstrapping where {nrfApiRoot} represents the concatenation of the "scheme" and "authority" components of the NRF, as defined in IETF RFC 3986 [17]; see also the definition of NRF FQDN and NRF URI in 3GPP TS 23.003 [12], clause 28.3.2.3.

2a. On success, "200 OK" shall be returned, the payload body of the GET response shall contain the requested bootstrapping information.

EXAMPLE

```
GET https://nrf.example.com/bootstrapping
Accept: application/3gppHal+json
HTTP/2 200 OK
Content-Type: application/3gppHal+json
{
  "status": "OPERATIVE",
```

-continued

```
  "_links": {
    "self": {
      "href": "https://nrf.example.com/bootstrapping"
    },
    "manage": {
      "href": "https://nrf.example.com/nnrf-nfm/v1/nf-instances"
    },
    "subscribe": {
      "href": "https://nrf.example.com/nnrf-nfm/v1/subscriptions"
    },
    "discover": {
      "href": "https://nrf.example.com/nnrf-disc/v1/nf-instances"
    },
    "authorize": {
      "href": "https://nrf.example.com/oauth2/token"
    }
  },
  "nrfFeatures": {
    "nnrf-nfm": "1",
    "nnrf-disc": "D",
    "nnrf-oauth2": "0"
  },
  "oauth2Required": {
    "nnrf-nfm": true,
    "nnrf-disc": false
  }}
```

2b. On failure or redirection:

Upon failure, the NRF shall return "400 Bad Request" status code, including in the response payload a JSON object that provides details about the specific error(s) that occurred.

In the case of redirection, the NRF shall return 3xx status code, which shall contain a Location header with an URI pointing to the endpoint of another NRF service instance".

Figure 6:
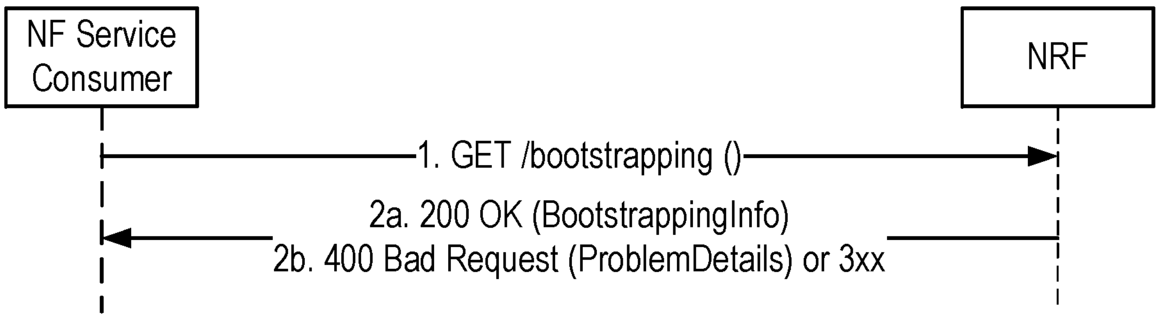
FIG. 6 illustrates a flowchart for a bootstrapping service operation, which is extracted from Section 5.5.2.2.1, 3GPP TS 29.510.

FIG. 6 illustrates a flowchart for a bootstrapping service operation, which is extracted from section 5.5.2.2.1 of 3GPP TS 29.510.

As for "BootstrappingInfo", i.e. the information returned by the NRF in a bootstrapping response message, it is defined in section 6.4.6.2 of 3GPP TS 29.510 as follows (wherein Table 4 corresponds to Table 6.4.6.2.2-1 in section 6.4.6.2.2 "Type: BootstrappingInfo" of 3GPP TS 29.510):

TABLE 4

Definition of type BootstrappingInfo

| Attribute name | Data type | P | Cardinality | Description |
|---|---|---|---|---|
| status | Status | O | 0 . . . 1 | Status of the NRF (operative, non-operative, . . .) The NRF shall be considered as operative if this attribute is absent. |
| _links | map(LinksValueSchema) | M | 1 . . . N | Map of LinksValueSchema objects, where the keys are the link relations, as described in Table 6.4.6.3.3.1-1 of 3GPP TS 29.510, and the values are objects containing an "href" attribute, whose value is an absolute URI corresponding to each link relation. |
| nrfFeatures | map(SupportedFeatures) | O | 1 . . . N | Map of features supported by the NRF, where the keys of the map are the NRF services (as defined in clause 6.1.6.3.11 of 3GPP TS 29.510), and where the value indicates the features supported by the corresponding NRF services. |

TABLE 4-continued

Definition of type BootstrappingInfo

| Attribute name | Data type | P | Cardinality | Description |
|---|---|---|---|---|
| | | | | When present, the NRF shall indicate all the features of all the services it supports. (NOTE) |
| oauth2Required | map(boolean) | O | 1 . . . N | When present, this IE shall indicate whether the NRF requires Oauth2-based authorization for accessing its services. The key of the map shall be the name of an NRF service, e.g. “nnrf-nfm” or “nnrf-disc”. The value of each entry of the map shall be encoded as follows: true: OAuth2 based authorization is required. false: OAuth2 based authorization is not required. The absence of this IE means that the NRF has not provided any indication about its usage of Oauth2 for authorization. |

(NOTE):
The absence of the nrfFeatures attribute in the BootstrappingInfo shall not be interpreted as if the NRF does not support any feature.

Figure 7:
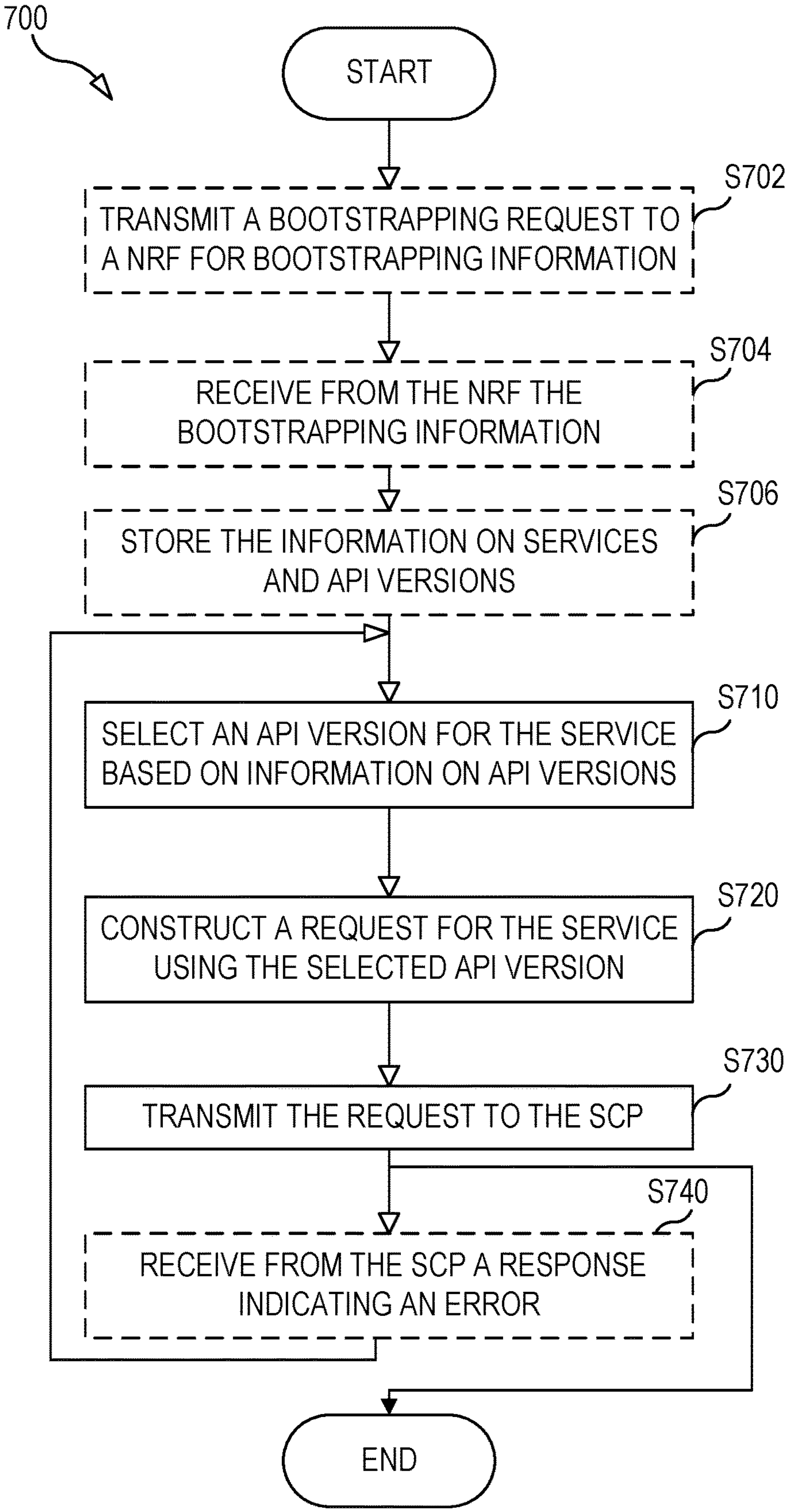
FIG. 7 illustratively shows a flowchart of a method for requesting a service with an SCP in model D according to an exemplary embodiment of the present disclosure.

FIG. 7 illustratively shows a flowchart of a method 700 for requesting a service with an SCP in model D, according to an exemplary embodiment of the present disclosure. In an embodiment, the method 700 may be performed at a first Network Function (NF) node. The first NF node may be, for example, an NF service consumer.

As shown in FIG. 7, the method 700 may include steps S702 to S740.

In step S710 of FIG. 7, the first NF node selects an API version for the service based on information on API versions for the service obtained by using a bootstrapping service and stored in the first NF node.

In step S720 of FIG. 7, the first NF node constructs a request for the service using the selected API version, and transmits the request to the SCP in step S730 of FIG. 7.

In an exemplary embodiment of the present disclosure, the method 700 may further comprise steps S702 to S706 for obtaining the information on API versions for the service. In particular, in step S702 of FIG. 7, the first NF node may transmit a bootstrapping request to an NRF for bootstrapping information, which comprises information on services and API versions supported by the services. Thus, the NRF can receive the bootstrapping request from the first NF node. That is, in step S704 of FIG. 7, in response to transmitting the bootstrapping request, the first NF node can receive, from the NRF, the bootstrapping information. In step S706 of FIG. 7, the NRF may store the information on services and API versions supported by the services.

In the present disclosure, by introducing a new optional attribute (for example, nfServicesApiVersionsList) into definition of type BootstrappingInfo, the NF service consumer knows about (is aware of) the services API versions per service name supported by the NF service producers that register in the operator network, by using a version-independent URI endpoint that does not need to be discovered by using a discovery service. The NF service consumer can invoke Nnrf_Bootstrapping service to get (acquire) supported API versions for each NF service producer to facilitate the service request handling in Model D.

An example for the new attribute may be as follows, where the attribute name and other properties are given as just an example:

TABLE 5

Definition of type BootstrappingInfo

| Attribute name | Data type | P | Cardinality | Description |
|---|---|---|---|---|
| nfServicesVersionsList | map(array(NFServiceVersion)) | O | 1 . . . N | Map of NFServiceVersions, where the “serviceName” attribute of the NFService object shall be used as the key of the map. The API versions supported by the NF Service and if available, the corresponding retirement date of the NF Service. The different array elements shall have distinct unique values for “apiVersionInUri”, and consequently, the values of “apiFullVersion” shall have a unique first digit version number. |

The new attribute can be included in Table 5 above, which corresponds to Table 6.4.6.2.2-1 "Definition of type BootstrappingInfo" of TS 29.510. For simplicity, not all relevant attributes in Table 6.4.6.2.2-1 of TS 29.510 are listed above.

In an exemplary embodiment of the present disclosure, the bootstrapping operation may be reused. The bootstrapping information that is returned by the NRF in the bootstrapping response message may be extended to include the information on services and API versions supported by the services. In the embodiment, by invoking the bootstrapping operation, the NF service consumer can obtain, from the NRF, not only the information on the NRF, but also the information on services and API versions supported by the services.

In an exemplary embodiment of the present disclosure, a dedicated bootstrapping operation may be defined, where the NF service consumer may invoke the dedicated bootstrapping operation, for example an "Nnrf_Bootstrapping_GetNFAPI" (just for example). The NRF may return, in the bootstrapping response message, only the information on services and API versions supported by the services. In the embodiment, the bootstrapping request may be a dedicated bootstrapping request for obtaining the information on services and API versions supported by the services.

In an exemplary embodiment of the present disclosure, the information on services and API versions supported by the services may further comprise information on NF nodes that support the API versions of the services. That is, the bootstrapping information that is returned by NRF may comprise not only the service name, API versions supported by the NF services, and also the NF service producers that supported the API versions.

In an exemplary embodiment of the present disclosure, the information on services and API versions supported by the services may be global services and API versions supported by the services. The NRF from which the first NF node gets (acquires) the information on services and API versions and the NRF to which the SCP register may be different, and thus the services and API versions can be global. In the embodiment, the NRF that receives the bootstrapping request from the first NF node may be capable of collecting global services and API versions supported by the services from at least another NRF, and return the global services and API versions supported by the services to the first NF node.

The SCP that receives the request for the service from the first NF node may then search for a second NF node that provides the service of the selected API version. This SCP may transmit the service request to the second NF node to process the service request. Thus, the second NF node can receive the service request from the SCP. In response, the SCP may receive a response from the second NF node. Thus, the second NF node can transmit the response to the SCP. This response may be transmitted (by the SCP) to the first NF node. Thus, the first NF node can receive this response (from the SCP). In some cases, there may be no such second NF node that provides the service of the selected API version. For example, the second NF node that provides the service of the selected API version may not be available at the time.

In an exemplary embodiment of the present disclosure, the method 700 may further comprise step S740, in which the first NF node receives from the SCP a response indicating an error. In response to the receiving of the response, the first NF node may repeat steps S710 to S730 of FIG. 7, i.e. reselect a different API version for the service based on the information on API versions for the service in step S710 of FIG. 7. Then, the first NF node may construct a different request for the service using the reselected API version in step S720 of Figure. The first NF node may transmit the different request to the SCP in step S730 of FIG. 7. Thus, the SCP may receive the different request from the first NF node. By changing the API version in constructing the service request, the possibility that the service request is successfully processed is enhanced.

In an exemplary embodiment of the present disclosure, step S702 of FIG. 7 of transmitting a bootstrapping request to an NRF for bootstrapping information may be performed at a power-on event at the first NF node, regularly (e.g. at predefined time intervals), or in response to receiving a response indicating an error from the SCP. When the first NF node is powered on, it may get (acquire) the information on services and API versions supported by the services for later use by invoking a bootstrapping service. The information may change over time. The first NF node may be configured to (e.g. regularly, such as at predefined time intervals) invoke the bootstrapping service so as to update its stored information. Alternatively, the first NF node may be configured to invoke the bootstrapping service so as to update its stored information in response to receiving a response indicating an error from the SCP. When receiving a response indicating an error, there may be cases that the error occurs due to mismatching between the information stored in the first NF node and the real-time information. For example, an NF service producer may be updated to support a different API version. The first NF node may update its stored information by invoking the bootstrapping service.

Figure 8:
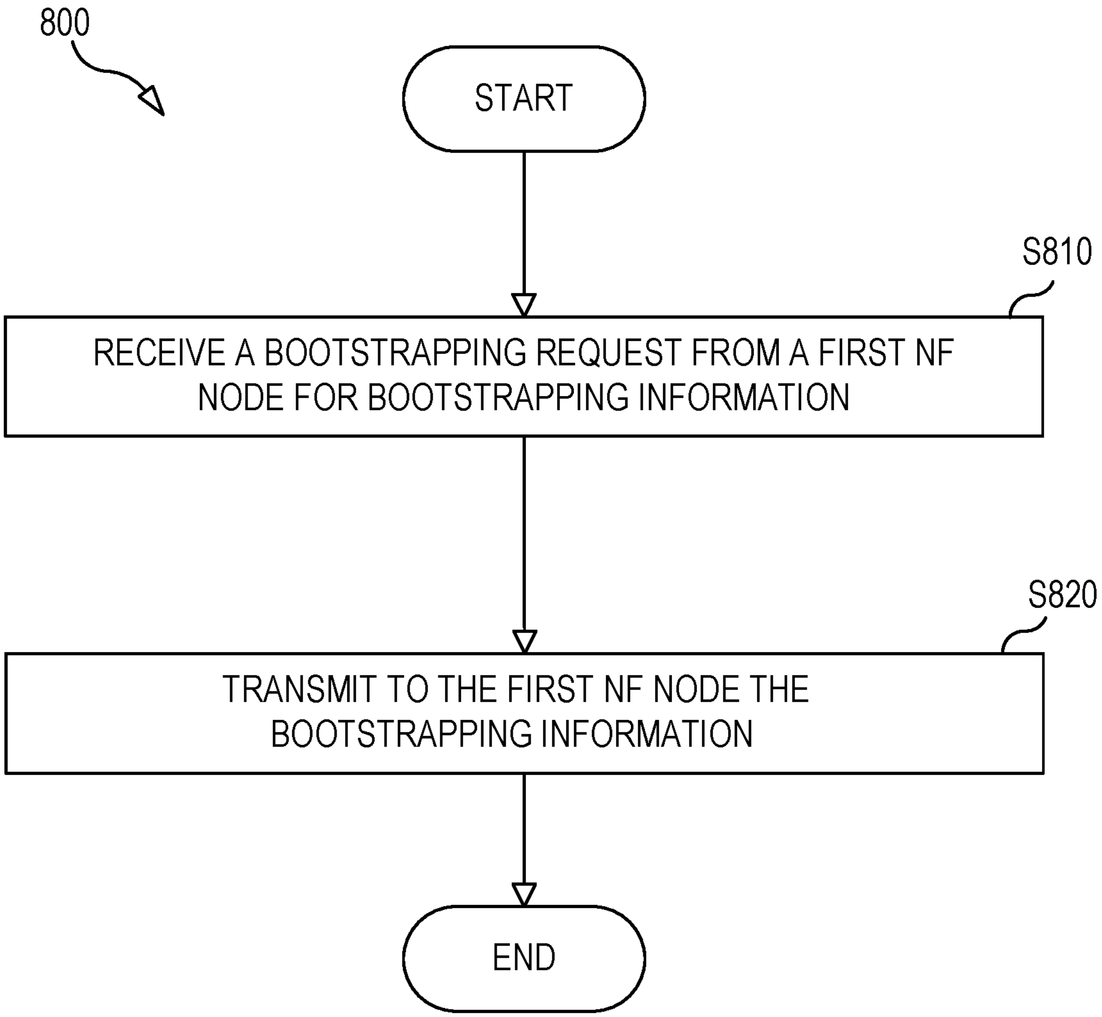
FIG. 8 illustratively shows a flowchart of a method for processing a bootstrapping service request according to an exemplary embodiment of the present disclosure.

FIG. 8 illustratively shows a flowchart of a method 800 for processing a bootstrapping service request according to an exemplary embodiment of the present disclosure. In an embodiment, the method 800 may be performed at an NRF.

As shown in FIG. 8, the method 800 may include steps S810 to S820.

In step S810 of FIG. 8, the NRF receives a bootstrapping request from a first NF node for bootstrapping information. Then, in step S820 of FIG. 8, in response to receiving the bootstrapping request, the NRF transmits to the first NF node the bootstrapping information. Thus, the first NF node can receive the bootstrapping information from the NRF.

In the present disclosure, the bootstrapping information is extended to comprise information on services and API versions supported by the services. Accordingly, the first NF node that transmits the bootstrapping request may receive the information on services and API versions supported by the services from the NRF. Thus, the NRF can transmit this information to the first NF node.

In an exemplary embodiment of the present disclosure, the bootstrapping operation may be reused. The bootstrapping information that is returned by the NRF in the bootstrapping response message may be extended to include the information on services and API versions supported by the services. In the embodiment, by invoking the bootstrapping operation, the NF service consumer can obtain from the NRF, not only the information on the NRF, but also the information on services and API versions supported by the services.

In an exemplary embodiment of the present disclosure, a dedicated bootstrapping operation may be defined, where the NF service consumer invokes the dedicated bootstrapping operation, for example an "Nnrf_Bootstrapping_GetNFAPI" (just for example). The NRF may return, in the bootstrapping response message, only the information on services and API versions supported by the services. In the embodiment, the bootstrapping request may be a dedicated bootstrapping request for obtaining the information on services and API versions supported by the services.

In an exemplary embodiment of the present disclosure, the information on services and API versions supported by the services may further comprise information on NF nodes that support the API versions of the services. That is, the bootstrapping information that is returned by the NRF may comprise, not only the service name, API versions supported by the NF services, and also the NF service producers that supported the API versions.

In an exemplary embodiment of the present disclosure, the information on services and API versions supported by the services may be global services and API versions supported by the services. The NRF from which the first NF node gets (acquires) the information on services and API versions and the NRF to which the SCP register may be different, and thus the services and API versions can be global. In the embodiment, the NRF that receives the bootstrapping request from the first NF node can be capable of collecting global services and API versions supported by the services from at least another NRF, and may return the global services and API versions supported by the services to the first NF node.

Figure 9:
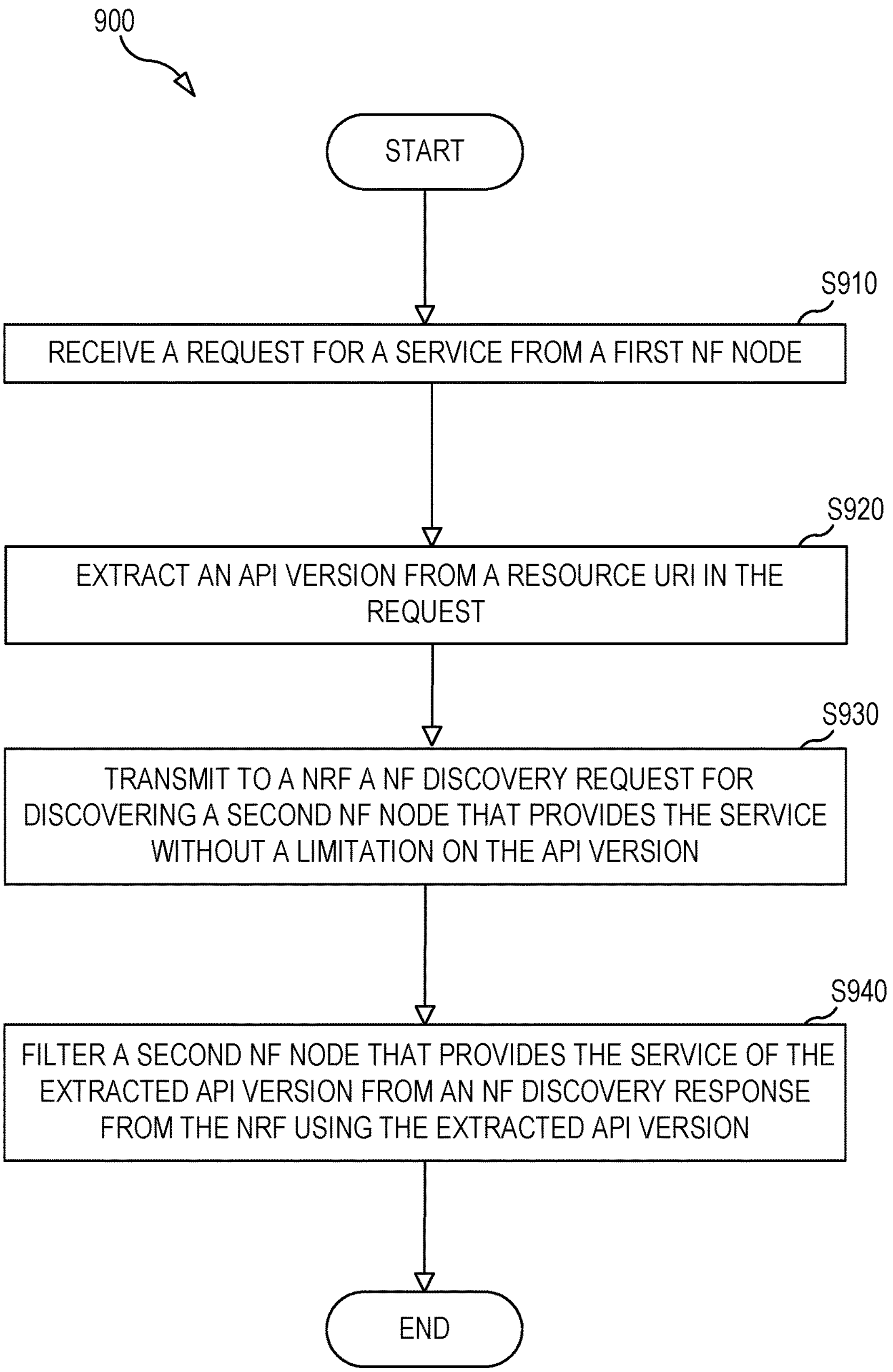
FIG. 9 illustratively shows a flowchart of a method for processing a service request according to an exemplary embodiment of the present disclosure.

FIG. 9 illustratively shows a flowchart of a method 900 for processing a service request according to an exemplary embodiment of the present disclosure. In an embodiment, the method 900 may be performed at an SCP.

As shown in FIG. 9, the method 900 may include steps S910 to S940.

In step S910 of FIG. 9, the SCP receives a request for a service from a first NF node. In step S920 of FIG. 9, the SCP extracts an API version from a Resource URI in the request. In step S930 of FIG. 9, the SCP transmits, to an NRF, an NF discovery request for discovering a second NF node that provides the service without a limitation on the API version. Thus, the NRF can receive the discovery request from the SCP. Then, in step S940 of FIG. 9, the SCP filters a second NF node that provides the service of the extracted API version from an NF discovery response from the NRF using the extracted API version. The SCP then transmits the service request to the second NF node to process the service request and, in response, receives a response from the second NF node. Thus, the second NF node can receive the service request from the SCP and, in response, can transmit a response to the SCP. The response may be transmitted (by the SCP) to the first NF node. Thus, the first NF node can receive the response (from the SCP).

It will be understood that the sequence of the method may not be limited thereto according to some embodiments. For example, the SCP may transmit an NF discovery request to an NRF, and extract the API version at the same time or after the transmitting of the NF discovery request.

By filtering the second NF node using an extracted API version, the possibility of successfully processing the service request can be enhanced compared with the SCP randomly selecting an NF service producer from the NF discovery response from the NRF. Furthermore, if the first NF node constructs the service request with knowledge on the available API version, the possibility of successfully processing the service request can be further enhanced, since the filtered second NF node just supports the API version selected by the first NF node. Certainly, the extracted API version may only indicate a major version. Accordingly, there may be cases that the full API version selected by the first NF node in constructing the service request may be NBC with the full API version supported by the NF node selected by the SCP, since the minor versions of the two API versions may be different. The embodiment at least addresses the NBC problem between major versions.

Figure 10:
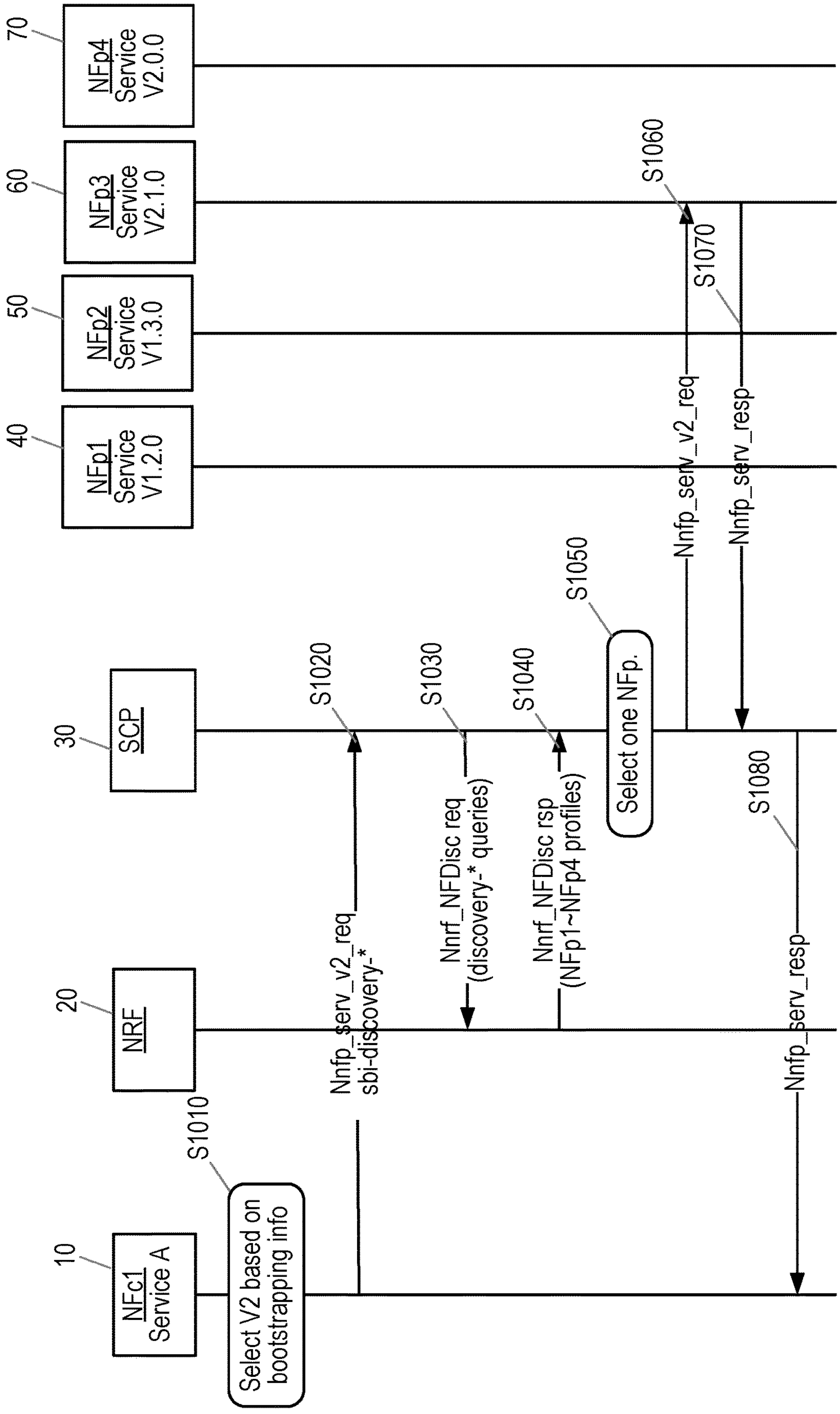
FIG. 10 shows an exemplifying signaling diagram illustrating details of the methods schematically illustrated in FIGS. 7 to 9.

FIG. 10 shows an exemplifying signaling diagram illustrating details of the methods schematically illustrated in FIGS. 7 to 9.

The example shown in FIG. 10 involves an NFc1, which is an NF service consumer, an NRF 20, an SCP 30, and NF service producers 40, 50, 60, 70 (i.e. NFp1 40, NFp2 50, NFp3 60, and NFp4 70). In the example illustrated in FIG. 10, NFp1 40 provides v1.2.0 of the service, NFp2 50 provides v1.3.0 of the service, NFp3 60 provides v2.1.0 of the service, and NFp4 70 provides v2.0.0 of the service. FIG. 10 is only an example, and it is known that the number of the NF service producers and the services provided by the NF service producers are shown only for illustration, and that other numbers of NF service producers and/or services is possible.

In step S1010 of FIG. 10, based on stored NF services API versions got (acquired) from bootstrapping information, NFc1 40 can get (acquire) a common API-version list supported by both itself and the target NF service. NFc1 40 can select an API-version from the common API-version list (for example, it may always choose the highest version or a version determined by local policy) to construct the resource URI of the service request. In an example, v2 is selected. In another example, the service request may be encoded with version 2.1.0. This version may be backward compatible (BC) with v2.0.0. On the other hand, this encoding may not be BC with version 1.x.y. Step S1010 of FIG. 10 is an example of steps S710 and S720 as shown in FIG. 7.

In step S1020 of FIG. 10, the NFc1 40 may transmit the service request to the SCP 30. Thus, the SCP 30 can receive the service request from NFc1. Step S1020 of FIG. 10 is an example of step S730 shown in FIG. 7 and step S910 shown in FIG. 9.

In step S1030 of FIG. 10, the SCP 30 may (need to) perform an NRF discovery to the NRF 20. Step S1030 of FIG. 10 is an example of step S930 as shown in FIG. 9.

In step S1040 of FIG. 10, the NRF 20 may provide corresponding profiles. In this case, it can be NFp1 to NFp4.

The SCP 30 can extract a major API-version derived from resource URI. The SCP 30 can use the extracted major API version to do (perform) filtering of returned profiles. The SCP 30 can figure out valid profiles that support the major API-version. In this case, it can be NFp3 60 and NFp4 70. In step S1050 of FIG. 10, the SCP 30 selects one NFp, e.g. NFp3 60. Step S1050 of FIG. 10 is an example of steps S920 and S940.

In step S1060 of FIG. 10, the SCP 30 may transmit the service request to the selected NF service producer, i.e., NFp3 60. Thus, NFp3 60 can receive the service request from the SCP 30.

In the example, NFp3 60 is able to process the request. Accordingly, in step S1070 of FIG. 10, the SCP 30 can receive a service response from NFp3 60, indicating successful processing of the service request.

The SCP 30 may forward the successful service response to the NFc1 40 in step S1080 of FIG. 10.

Figure 11:
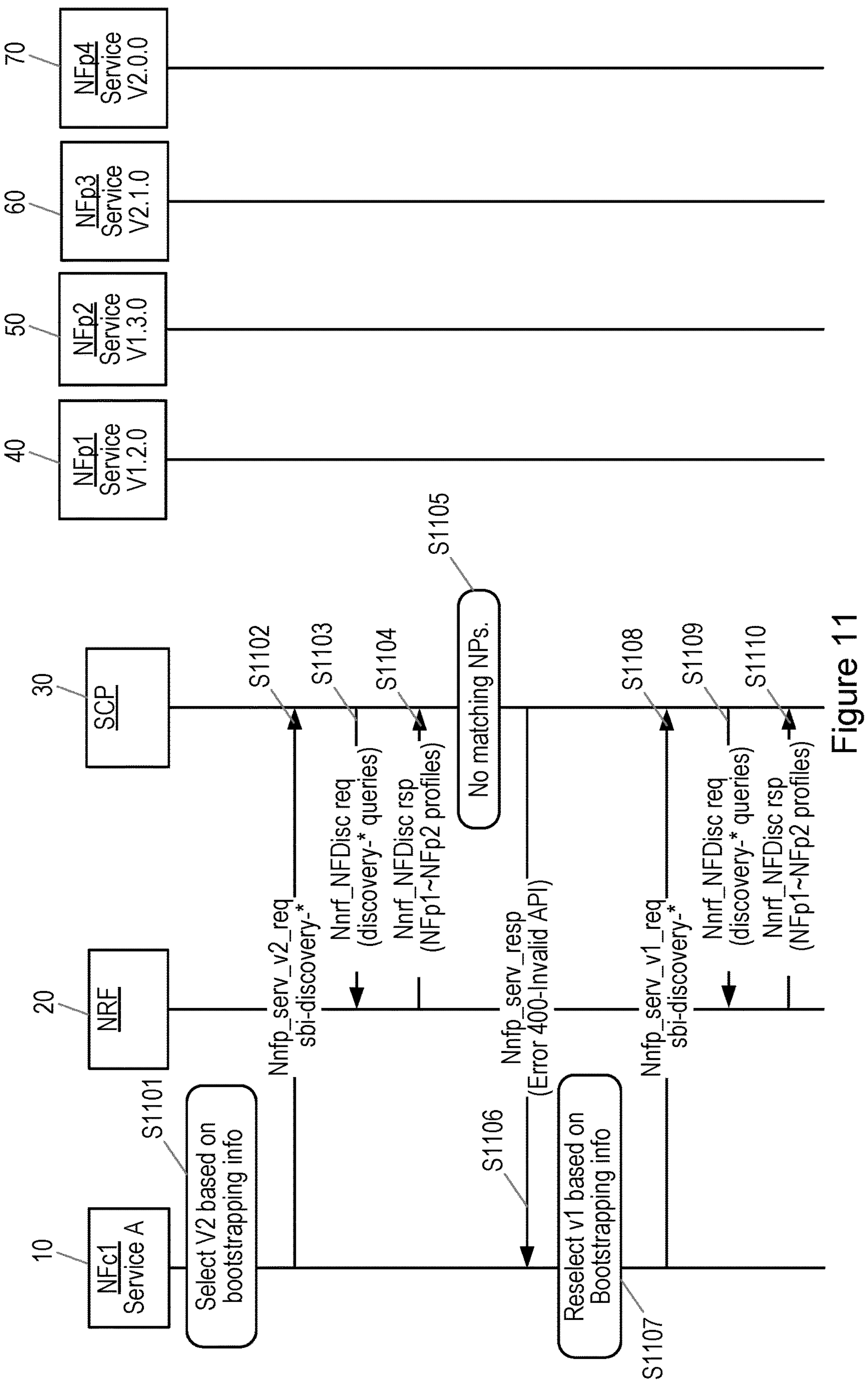
FIG. 11 shows another exemplifying signaling diagram illustrating details of the methods schematically illustrated in FIGS. 7 to 9.
Figure 11:
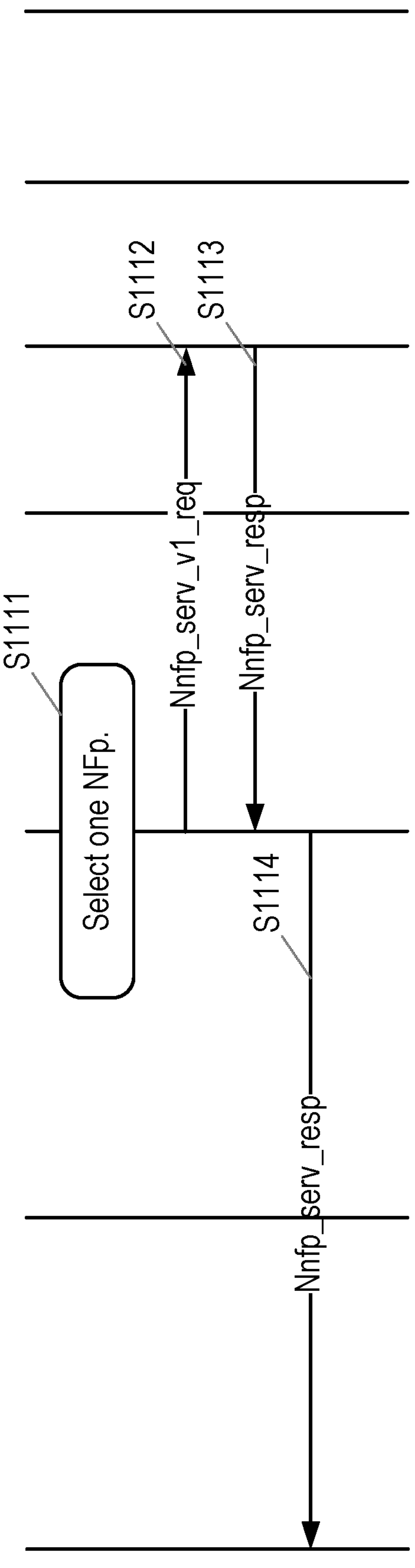

FIG. 11 shows another exemplifying signaling diagram illustrating details of the methods schematically illustrated in FIGS. 7 to 9.

The example shown in FIG. 11 involves an NFc1 10, which is an NF service consumer, an NRF 20, an SCP 30, and NF service producers 40, 50, 60, 70 (i.e. NFp1 40, NFp2 50, NFp3 60, and NFp 70). NFp1 40 provides v1.2.0 of the service, NFp2 50 provides v1.3.0 of the service, NFp3 60 provides v2.1.0 of the service, and NFp4 70 provides v2.0.0 of the service. FIG. 11 is only an example, and it is known that the number of the NF service producers and the services provided by the NF service producers are shown only for illustration, and that other numbers of NF service producers and/or services is possible.

In step S1101 of FIG. 11, based on stored NF services API versions got (acquired) from bootstrapping information, NFc1 40 can get (acquire) a common API-version list supported by both itself and the target NF service. NFc1 40 can select an API-version from the common API-version list (for example, it may always choose the highest version or a version determined by local policy) to construct the resource URI of the service request. In an example, v2 is selected. In another example, the service request may be encoded with version 2.1.0. This version may be BC with v2.0.0. On the other hand, this encoding may not be BC with version 1.x.y. Step S1101 of FIG. 11 is an example of steps S710 and S720 as shown in FIG. 7.

In step S1102 of FIG. 11, NFc1 40 may transmit the service request to the SCP 30. Thus, the SCP 30 may receive the service request from NFc1 40. Step S1102 of FIG. 11 is an example of step S730 shown in FIG. 7 and step S910 shown in FIG. 9.

In step S1103 of FIG. 11, the SCP 30 may (need to) perform an NRF discovery to the NRF 20. Step S1103 of FIG. 11 is an example of step S930 as shown in FIG. 9.

In step S1104 of FIG. 11, the NRF 20 may provide corresponding profiles. In this example, it is assumed that NFp3 60 and NFp4 70 are temporarily unavailable, and the NRF 20 provides corresponding profiles of NFp1 40 and NFp2 50 in the NF discovery response.

In step S1105 of FIG. 11, the SCP 30 may extract a major API-version derived from the resource URI. The SCP 30 may use the extracted major API version to do (perform) the filtering of returned profiles. In this case, the SCP 30 may find out there are no valid profiles that support the major API-version. Step S1105 of FIG. 11 is an example of steps S920 and S940 as shown in FIG. 9.

The SCP 30 is unable to solve the situation, since the resource URI is constructed based on API-version v2. The SCP 30 cannot modify the resource URI. So, the SCP 30 may forward an error response to the NFc1 40 in step S1106 of FIG. 11. Step S1106 of FIG. 11 is an example of step S740 as shown in FIG. 7.

NFc1 40, which receives the error response, knows (is aware) that the selected major API-version is not supported by the discovered NFps. In step S1107 of FIG. 11, NFc1 40 may (re) select an alternative major API-version from the common API-version list got (acquired) from bootstrapping information. NFc1 40 may adapt the encoded service request to the new API-version. In this example, v1 is (re) selected. Step S1107 of FIG. 11 is an example of steps S710 and S720 as shown in FIG. 7.

In step S1108 of FIG. 11, NFc1 40 may transmit the service request constructed based on major API-version v1 to the SCP 30. Thus, the SCP 30 may receive the service request from NFc1 40. Step S1108 of FIG. 11 is an example of step S730 as shown in FIG. 7.

In step S1109 of FIG. 11, the SCP 30 may (need to) perform an NRF discovery to the NRF 20. Step S1109 of FIG. 11 is an example of step S930 as shown in FIG. 9.

In step S1110 of FIG. 11, the NRF 20 may provide corresponding profiles. In this example, the NRF 20 provides corresponding profiles of NFp1 40 and NFp2 50 in the NF discovery response.

The SCP 30 may extract a major API-version derived from resource URI. The SCP 30 may use the extracted major API version to do (perform) the filtering of returned profiles. The SCP 30 may figure out valid profiles that support the major API-version. In this case, it can be NFp1 40 and NFp2 50. In step S1111 of FIG. 11, the SCP 30 selects one NFp, e.g. NFp2 50.

In step S1112 of FIG. 11, the SCP 30 may transmit the service request to the selected NF service producer, i.e., NFp2 50. Thus, NFp2 50 may receive the service request from the SCP 30.

In the example, NFp2 50 is able to process the request. Accordingly, in step S1113 of FIG. 11, the SCP 30 can receive a service response from NFp2 50, indicating successful processing of the service request.

The SCP 30 may forward the successful service response to the NFc1 40 in step S1114 of FIG. 11.

Figure 12:
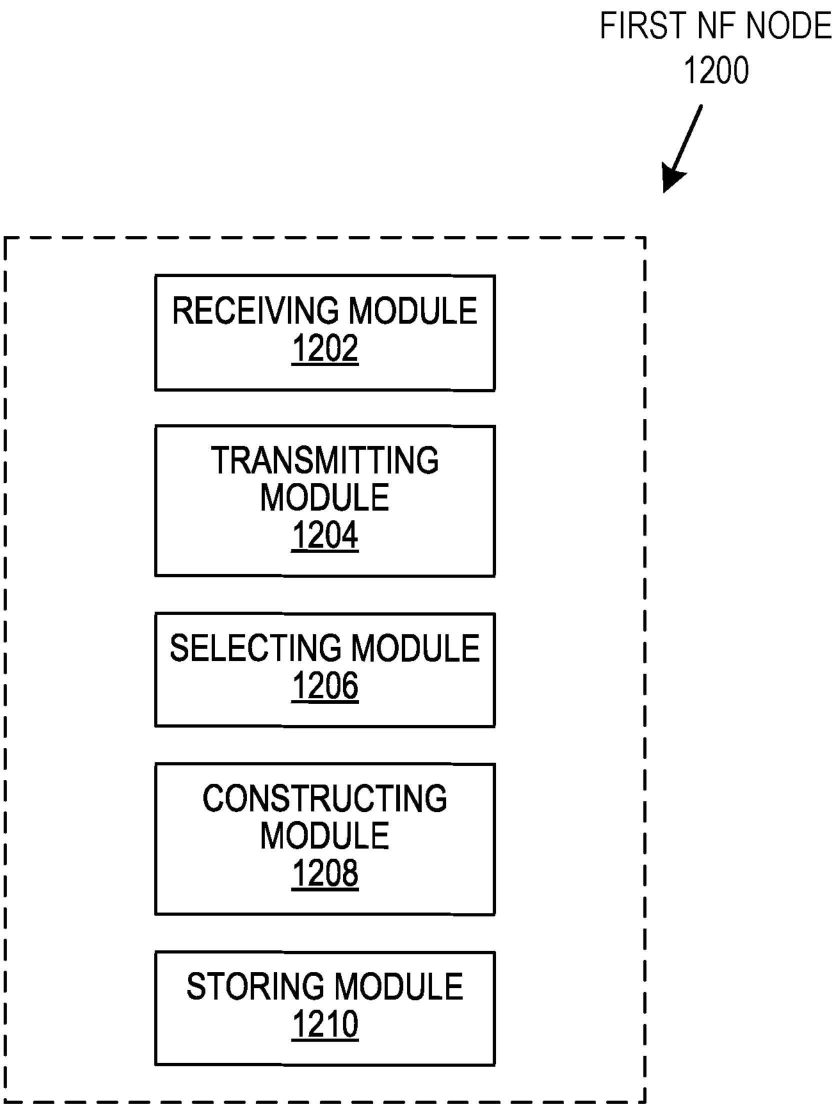
FIG. 12 illustratively shows a schematic structure diagram of a first NF node according to an exemplary embodiment of the present disclosure.

Hereinafter, a structure of a first NF node will be described with reference to FIG. 12. FIG. 12 illustratively shows a schematic structure diagram of a first NF node 1200 (e.g. NFc1 10 as shown in FIGS. 10 and 11, as described previously) according to an exemplary embodiment of the present disclosure. The first NF node 1200 in FIG. 12 may perform the method 700 for requesting a service described previously with reference to FIG. 7. Accordingly, some detailed description on the first NF node 1200 may refer to the corresponding description of the method 700 for requesting a service as previously discussed.

As shown in FIG. 12, the first NF node 1200 may include a receiving module 1202, a transmitting module 1204, a selecting module 1206, a constructing module 1208, and a storing module 1210. As will be understood by the person skilled in the art, common components in the first NF node 1200 are omitted in FIG. 12 for not obscuring the idea of the present disclosure. Also, some modules may be distributed in more modules or integrated into fewer modules. For example, the receiving module 1202 and the transmitting module 1204 may be integrated into a transceiver module.

In an exemplary embodiment of the present disclosure, the selecting module 1206 of the first NF node 1200 may be configured to select an API version for the service based on information on API versions for the service obtained by using a bootstrapping service and stored in the first NF node. The constructing module 1208 of the first NF node 1200 may be configured to construct a request for the service using the selected API version. The transmitting module 1204 of the first NF node 1200 may be configured to transmit the request to the SCP.

In an exemplary embodiment of the present disclosure, the transmitting module 1204 of the first NF node 1200 may be configured to transmit a bootstrapping request to an NRF for bootstrapping information which comprises information on services and API versions supported by the services. In response to transmitting the bootstrapping request, the receiving module 1202 of the first NF node 1200 may be configured to receive from the NRF the bootstrapping information, and the storing module 1210 of the first NF node 1200 may be configured to store the information on services and API versions supported by the services.

In the present disclosure, by introducing a new optional attribute (for example, nfServicesApiVersionsList) into definition of type BootstrappingInfo, the NF service consumer knows about (is aware of) the services API versions per service name supported by the NF service producers that register in the operator network, by using a version-independent URI endpoint that does not need to be discovered by using a Discovery service. The first NF node 1200 invokes Nnrf_Bootstrapping service to get (acquire) supported API versions for each NF service producer to facilitate the service request handling in Model D.

In an exemplary embodiment of the present disclosure, the bootstrapping operation may be reused, and the bootstrapping information that is returned by NRF in the bootstrapping response message may be extended to include the information on services and API versions supported by the services. In the embodiment, by invoking the bootstrapping operation, the first NF node 1200 may obtain from the NRF not only the information on the NRF, but also the information on services and API versions supported by the services.

In an exemplary embodiment of the present disclosure, a dedicated bootstrapping operation may be defined, where the first NF node 1200 may invoke the dedicated bootstrapping operation, for example a Nnrf_Bootstrapping_GetNFAPI (just for example), and the NRF may return in the bootstrapping response message only the information on services and API versions supported by the services. In the embodiment, the bootstrapping request may be a dedicated bootstrapping request for obtaining the information on services and API versions supported by the services.

In an exemplary embodiment of the present disclosure, the information on services and API versions supported by the services may further comprise information on NF nodes that support the API versions of the services. That is, the bootstrapping information that is returned by NRF may comprise not only the service name, API versions supported by the NF services, and also the NF service producers that supported the API versions.

In an exemplary embodiment of the present disclosure, the information on services and API versions supported by the services may be global services and API versions supported by the services. The NRF from which the first NF node may get (acquire) the information on services and API versions and the NRF to which the SCP register may be different, and thus the services and API versions can be global. In the embodiment, the NRF that receives the bootstrapping request from the first NF node can be capable of collecting global services and API versions supported by the services from at least another NRF, and may return the global services and API versions supported by the services to the first NF node.

The SCP that receives the request for the service from the first NF node 1200 may then search for a second NF node that provides the service of the selected API version, and transmit the service request to the second NF node to process the service request, and in response receive a response from the second NF node, which response will be transmitted to the first NF node 1200. In some cases, there may be no such second NF node that provides the service of the selected API version. For example, the second NF node that provides the service of the selected API version may not be available at the time.

In an exemplary embodiment of the present disclosure, the receiving module 1202 of the first NF node 1200 may be configured to receive from the SCP a response indicating an error. In response to the receiving of the response, the selecting module 1206 of the first NF node 1200 may be configured to reselect a different API version for the service based on the information on API versions for the service. The constructing module 1208 of the first NF node 1200 may be configured to construct a different request for the service using the reselected API version, and the transmitting module 1204 of the first NF node 1200 may be configured to transmit the different request to the SCP. By changing the API version in constructing the service request, the possibility that the service request is successfully processed is enhanced.

In an exemplary embodiment of the present disclosure, the transmitting module 1204 of the first NF node may be configured to transmit a bootstrapping request to an NRF for bootstrapping information at a power-on event at the first NF node, regularly, or in response to receiving a response indicating an error from the SCP. When the first NF node 1200 is powered on, it may get (acquire) the information on services and API versions supported by the services for later use by invoking a bootstrapping service. The information may change over time. The first NF node 1200 may be configured to regularly invoke the bootstrapping service so as to update its stored information. Alternatively, the first NF node 1200 may be configured to invoke the bootstrapping service so as to update its stored information in response to receiving a response indicating an error from the SCP. When receiving a response indicating an error, there may be cases that the error occurs due to mismatching between the information stored in the first NF node and the real-time information. For example, an NF service producer may be updated to support a different API version. The first NF node 1200 may update its stored information by invoking the bootstrapping service.

Figure 13:
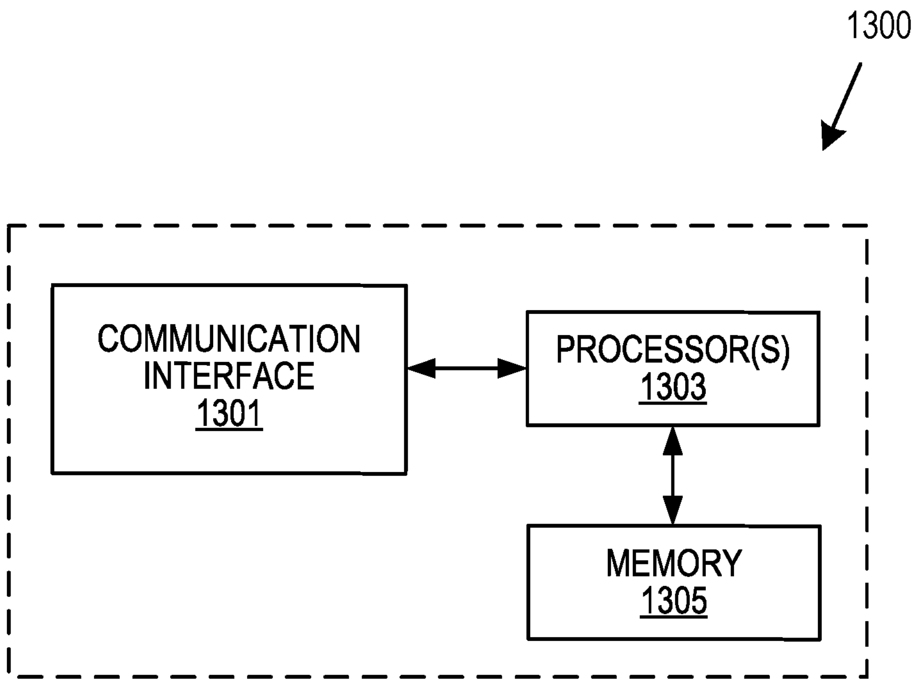
FIG. 13 illustratively shows a schematic structure diagram of a first NF node according to an exemplary embodiment of the present disclosure.

Hereinafter, another structure of a first NF node 1300 will be described with reference to FIG. 13. FIG. 13 illustratively shows a schematic structure diagram of a first NF node 1300 (e.g., NFc1 10 as shown in FIGS. 10 and 11, as described previously) according to an exemplary embodiment of the present disclosure. The first NF node 1300 in FIG. 13 may perform the method 700 for requesting a service described previously with reference to FIG. 7. Accordingly, some detailed description on the first NF node 1300 may refer to the corresponding description of the method 700 for requesting a service as previously discussed.

As shown in FIG. 13, the first NF node 1300 may include at least one controller or processor 1303 including, e.g. any suitable Central Processing Unit (CPU), microcontroller, Digital Signal Processor (DSP), etc., capable of executing computer program instructions. The computer program instructions may be stored in a memory 1305. The memory 1305 may be any combination of a Random Access Memory (RAM) and a Read Only Memory (ROM). The memory may also comprise persistent storage, which, for example, can be any single one or combination of magnetic memory, optical memory, or solid state memory or even remotely mounted memory. The exemplary first NF node 1300 further comprises a communication interface 1301 arranged for communication.

The instructions, when loaded from the memory 1305 and executed by the at least one processor 1303, may cause the first NF node 1300 to perform the method 700 for requesting a service as previously discussed.

In particular, in an exemplary embodiment of the present disclosure, the instructions, when loaded from the memory 1305 and executed by the at least one processor 1303, may cause the first NF node 1300 to select an API version for the service based on information on API versions for the service obtained by using a bootstrapping service and stored in the first NF node, construct a request for the service using the selected API version, and transmit the request to the SCP.

In an exemplary embodiment of the present disclosure, the instructions, when loaded from the memory 1305 and executed by the at least one processor 1303, may cause the first NF node 1300 to transmit a bootstrapping request to an NRF for bootstrapping information which comprises information on services and API versions supported by the services; in response to transmitting the bootstrapping request, to receive from the NRF the bootstrapping information, and then to store the information on services and API versions supported by the services.

In the present disclosure, by introducing a new optional attribute (for example, nfServicesApiVersionsList) into definition of type BootstrappingInfo, the NF service consumer knows about the services API versions per service name supported by the NF service producers that register in the operator network, by using a version-independent URI endpoint that does not need to be discovered by using a Discovery service. The first NF node 1300 invokes Nnrf_Bootstrapping service to get supported API versions for each NF service producer to facilitate the service request handling in Model D.

In an exemplary embodiment of the present disclosure, the bootstrapping operation may be reused, and the bootstrapping information that is returned by NRF in the bootstrapping response message may be extended to include the information on services and API versions supported by the services. In the embodiment, by invoking the bootstrapping operation, the first NF node 1300 may obtain from the NRF not only the information on the NRF, but also the information on services and API versions supported by the services.

In an exemplary embodiment of the present disclosure, a dedicated bootstrapping operation may be defined, where the first NF node 1300 may invoke the dedicated bootstrapping operation, for example a Nnrf_Bootstrapping_GetNFAPI (just for example), and the NRF may return in the bootstrapping response message only the information on services and API versions supported by the services. In the embodiment, the bootstrapping request may be a dedicated bootstrapping request for obtaining the information on services and API versions supported by the services.

In an exemplary embodiment of the present disclosure, the information on services and API versions supported by the services may further comprise information on NF nodes that support the API versions of the services. That is, the bootstrapping information that is returned by NRF may comprise not only the service name, API versions supported by the NF services, and also the NF service producers that supported the API versions.

In an exemplary embodiment of the present disclosure, the information on services and API versions supported by the services may be global services and API versions supported by the services. The NRF from which the first NF node gets (acquires) the information on services and API versions and the NRF to which the SCP is registered may be different, and thus the services and API versions can be global. In the embodiment, the NRF that receives the bootstrapping request from the first NF node can be capable of collecting global services and API versions supported by the services from at least another NRF, and may return the global services and API versions supported by the services to the first NF node.

The SCP that receives the request for the service from the first NF node1300 may then search for a second NF node that provides the service of the selected API version, transmit the service request to the second NF node to process the service request, and in response receive a response from the second NF node, which response will be transmitted to the first NF node 1300. In some cases, there may be no such second NF node that provides the service of the selected API version. For example, the second NF node that provides the service of the selected API version may not available at the time.

In an exemplary embodiment of the present disclosure, the instructions, when loaded from the memory 1305 and executed by the at least one processor 1303, may cause the first NF node 1300 to receive from the SCP a response indicating an error, in response to the receiving of the response, to reselect a different API version for the service based on the information on API versions for the service; to construct a different request for the service using the reselected API version, and to transmit the different request to the SCP. By changing the API version in constructing the service request, the possibility that the service request is successfully processed is enhanced.

In an exemplary embodiment of the present disclosure, the instructions, when loaded from the memory 1305 and executed by the at least one processor 1303, may cause the first NF node 1300 to transmit a bootstrapping request to an NRF for bootstrapping information at a power-on event at the first NF node, regularly, or in response to receiving a response indicating an error from the SCP. When the first NF node 1300 is powered on, it may get (acquire) the information on services and API versions supported by the services for later use by invoking a bootstrapping service. The information may change over time. The first NF node 1300 may be configured to regularly invoke the bootstrapping service so as to update its stored information. Alternatively, the first NF node 1300 may be configured to invoke the bootstrapping service so as to update its stored information in response to receiving a response indicating an error from the SCP. When receiving a response indicating an error, there may be cases that the error occurs due to mismatching between the information stored in the first NF node and the real-time information. For example, an NF service producer may be updated to support a different API version. The first NF node 1300 may update its stored information by invoking the bootstrapping service.

Figure 14:
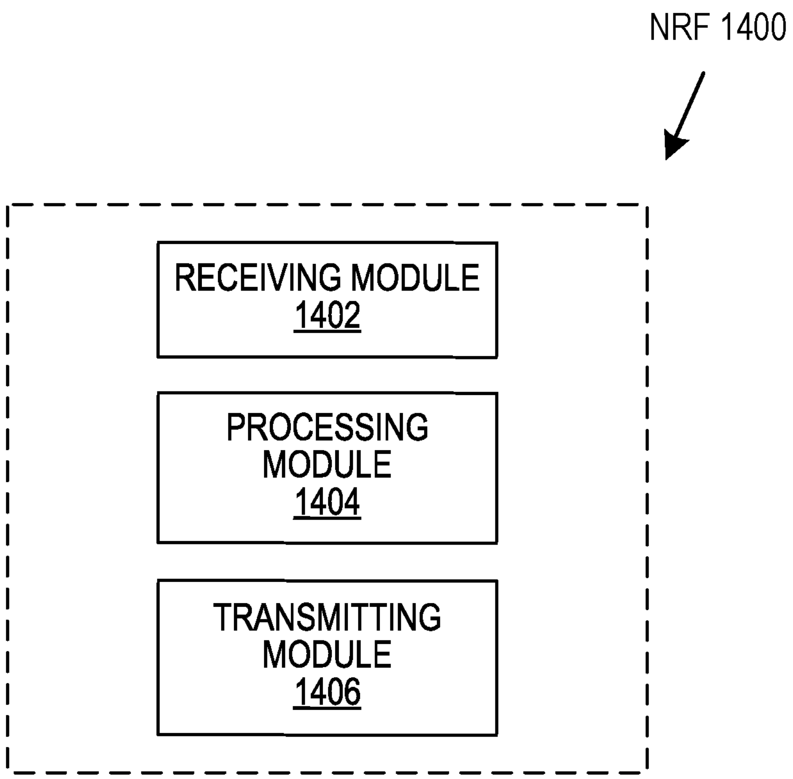
FIG. 14 illustratively shows a schematic structure diagram of an NRF according to an exemplary embodiment of the present disclosure.

Hereinafter, a structure of an NRF will be described with reference to FIG. 14. FIG. 14 illustratively shows a schematic structure diagram of an NRF 1400 (e.g. NRF 20 as shown in FIGS. 10 to 11, as described previously) according to an exemplary embodiment of the present disclosure. The NRF 1400 in FIG. 14 may perform the method 800 for processing a bootstrapping service request described previously with reference to FIG. 8. Accordingly, some detailed description on the NRF 1400 may refer to the corresponding description of the method 800 for processing a bootstrapping service request as previously discussed.

As shown in FIG. 14, the NRF 1400 may include a receiving module 1402, a processing module 1404, and a transmitting module 1406. As will be understood by the person skilled in the art, common components in the NRF 1400 are omitted in FIG. 14 for not obscuring the idea of the present disclosure. Also, some modules may be distributed in more modules or integrated into fewer modules. For example, the receiving module 1402 and the transmitting module 1406 may be integrated into a transceiver module.

In an exemplary embodiment of the present disclosure, the receiving module 1402 of the NRF 1400 may be configured to receive a bootstrapping request from a first NF node for bootstrapping information. The processing module 1404 of the NRF 1400 may be configured to process the request and construct a response. The transmitting module 1406 of the NRF 1400 may be configured to transmit to the first NF node the bootstrapping information in the response.

In the present disclosure, the bootstrapping information is extended to comprise information on services and API versions supported by the services. Accordingly, the first NF node that transmits the bootstrapping request may receive the information on services and API versions supported by the services from the NRF 1400.

In an exemplary embodiment of the present disclosure, the bootstrapping operation may be reused, and the bootstrapping information that is returned by NRF in the bootstrapping response message may be extended to include the information on services and API versions supported by the services. In the embodiment, by invoking the bootstrapping operation, the NF service consumer may obtain from the NRF 1400 not only the information on the NRF, but also the information on services and API versions supported by the services.

In an exemplary embodiment of the present disclosure, a dedicated bootstrapping operation may be defined, where the NF service consumer may invoke the dedicated bootstrapping operation, for example a Nnrf_Bootstrapping_GetNFAPI (just for example), and the NRF may return in the bootstrapping response message only the information on services and API versions supported by the services. In the embodiment, the bootstrapping request may be a dedicated bootstrapping request for obtaining the information on services and API versions supported by the services.

In an exemplary embodiment of the present disclosure, the information on services and API versions supported by the services may further comprise information on NF nodes that support the API versions of the services. That is, the bootstrapping information that is returned by the NRF 1400 may comprise not only the service name, API versions supported by the NF services, and also the NF service producers that supported the API versions.

In an exemplary embodiment of the present disclosure, the information on services and API versions supported by the services may be global services and API versions supported by the services. The NRF from which the first NF node gets (acquires) the information on services and API versions and the NRF to which the SCP register may be different, and thus the services and API versions can be global. In the embodiment, the processing module 1404 of the NRF 1400 that receives the bootstrapping request from the first NF node may be configured to collect global services and API versions supported by the services from at least another NRF, and the transmitting module 1406 of the NRF 1400 may be configured to transmit the global services and API versions supported by the services to the first NF node.

Figure 15:
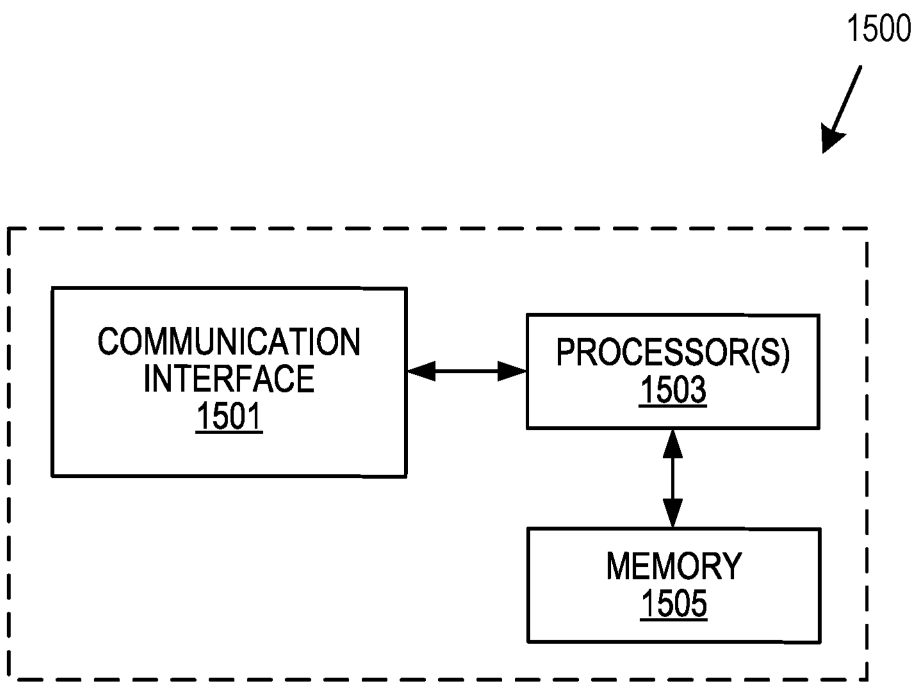
FIG. 15 illustratively shows a schematic structure diagram of an NRF according to an exemplary embodiment of the present disclosure.

Hereinafter, another structure of an NRF 1500 will be described with reference to FIG. 15. FIG. 15 illustratively shows a schematic structure diagram of an NRF 1500 (e.g., NRF 20 as shown in FIGS. 10 to 11, as described previously) according to an exemplary embodiment of the present disclosure. The NRF 1500 in FIG. 15 may perform the method 800 for processing a bootstrapping service request described previously with reference to FIG. 8. Accordingly, some detailed description on the NRF 1500 may refer to the corresponding description of the method 800 for processing a bootstrapping service request as previously discussed.

As shown in FIG. 15, the NRF 1500 may include at least one controller or processor 1503 including e.g., any suitable CPU, microcontroller, DSP, etc., capable of executing computer program instructions. The computer program instructions may be stored in a memory 1505. The memory 1505 may be any combination of a RAM and a ROM. The memory may also comprise persistent storage, which, for example, can be any single one or combination of magnetic memory, optical memory, or solid state memory or even remotely mounted memory. The exemplary NRF 1500 further comprises a communication interface 1501 arranged for communication.

The instructions, when loaded from the memory 1505 and executed by the at least one processor 1503, may cause the NRF 1500 to perform the method 800 for processing a bootstrapping service request as previously discussed.

In particular, in an exemplary embodiment of the present disclosure, the instructions, when loaded from the memory 1505 and executed by the at least one processor 1503, may cause the NRF 1500 to receive a bootstrapping request from a first NF node for bootstrapping information, process the request and construct a response, and transmit to the first NF node the bootstrapping information in the response.

In the present disclosure, the bootstrapping information is extended to comprise information on services and API versions supported by the services. Accordingly, the first NF node that transmits the bootstrapping request may receive the information on services and API versions supported by the services from the NRF 1500.

In an exemplary embodiment of the present disclosure, the bootstrapping operation may be reused, and the bootstrapping information that is returned by NRF in the bootstrapping response message may be extended to include the information on services and API versions supported by the services. In the embodiment, by invoking the bootstrapping operation, the NF service consumer may obtain from the NRF 1500 not only the information on the NRF, but also the information on services and API versions supported by the services.

In an exemplary embodiment of the present disclosure, a dedicated bootstrapping operation may be defined, where the NF service consumer may invoke the dedicated bootstrapping operation, for example a Nnrf_Bootstrapping_GetNFAPI (just for example), and the NRF may return in the bootstrapping response message only the information on services and API versions supported by the services. In the embodiment, the bootstrapping request may be a dedicated bootstrapping request for obtaining the information on services and API versions supported by the services.

In an exemplary embodiment of the present disclosure, the information on services and API versions supported by the services may further comprise information on NF nodes that support the API versions of the services. That is, the bootstrapping information that is returned by the NRF 1500 may comprise not only the service name, API versions supported by the NF services, and also the NF service producers that supported the API versions.

In an exemplary embodiment of the present disclosure, the information on services and API versions supported by the services may be global services and API versions supported by the services. The NRF from which the first NF node gets (acquires) the information on services and API versions and the NRF to which the SCP register may be different, and thus the services and API versions can be global. In the embodiment, the instructions, when loaded from the memory 1505 and executed by the at least one processor 1503, may cause the NRF 1500 to collect global services and API versions supported by the services from at least another NRF, and transmit the global services and API versions supported by the services to the first NF node.

Figure 16:
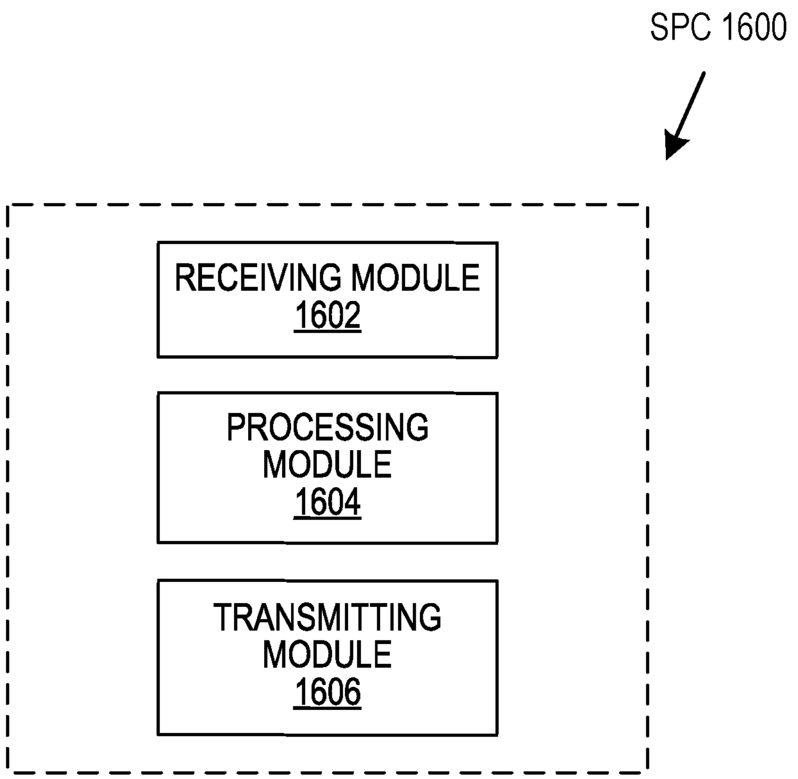
FIG. 16 illustratively shows a schematic structure diagram of an SCP according to an exemplary embodiment of the present disclosure.

Hereinafter, a structure of an SCP will be described with reference to FIG. 16. FIG. 16 illustratively shows a schematic structure diagram of an SCP 1600 (e.g. SCP 30 as shown in FIGS. 10 to 11, as described previously) according to an exemplary embodiment of the present disclosure. The SCP 1600 in FIG. 16 may perform the method 900 for processing a service request described previously with reference to FIG. 9. Accordingly, some detailed description on the SCP 1600 may refer to the corresponding description of the method 900 for processing a service request as previously discussed.

As shown in FIG. 16, the SCP 1600 may include a receiving module 1602, a processing module 1604, and a transmitting module 1606. As will be understood by the person skilled in the art, common components in the SCP 1600 are omitted in FIG. 16 for not obscuring the idea of the present disclosure. Also, some modules may be distributed in more modules or integrated into fewer modules. For example, the receiving module 1602 and the transmitting module 1606 may be integrated into a transceiver module.

In an exemplary embodiment of the present disclosure, the receiving module 1602 of the SCP 1600 may be configured to receive a request for a service from a first NF node. The processing module 1604 of the SCP 1600 may be configured to extract an API version from a Resource URI in the request. The transmitting module 1606 of the SCP 1600 may be configured to transmit to an NRF an NF discovery request for discovering a second NF node that provides the service without a limitation on the API version. The processing module 1604 of the SCP 1600 may be configured to filter a second NF node that provides the service of the extracted API version from an NF discovery response from the NRF using the extracted API version. The transmitting module 1606 of the SCP 1600 may be configured to transmit the service request to the second NF node to process the service request, and in response, the receiving module 1602 of the SCP 1600 may be configured to receive a response from the second NF node, which response will be transmitted to the first NF node by the transmitting module 1606.

By filtering the second NF node using an extracted API version, the possibility of successfully processing the service request is enhanced compared with the SCP randomly selecting an NF service producer from the NF discovery response from the NRF. Furthermore, if the first NF node constructs the service request with knowledge on the available API version, the possibility of successfully processing the service request is further enhanced, since the filtered second NF node just supports the API version selected by the first NF node. Certainly, the extracted API version may only indicate a major version. Accordingly, there may be cases that the full API version selected by the first NF node in constructing the service request may be NBC with the full API version supported by the NF node selected by the SCP, since the minor versions of the two API versions are different. The embodiment at least addresses the NBC problem between major versions.

Figure 17:
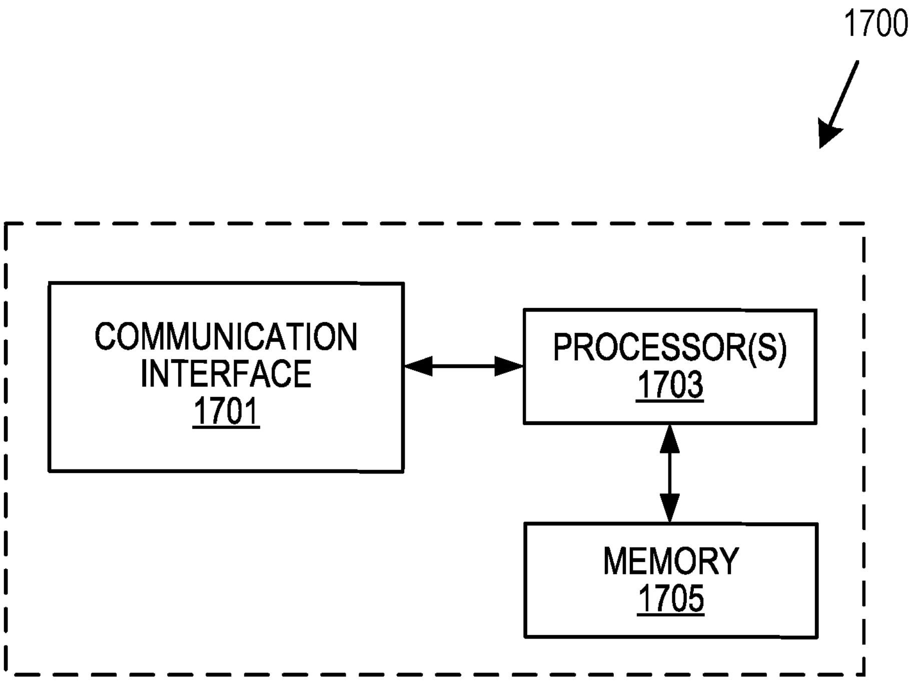
FIG. 17 illustratively shows a schematic structure diagram of an SCP according to an exemplary embodiment of the present disclosure.

Hereinafter, another structure of an SCP will be described with reference to FIG. 17. FIG. 17 illustratively shows a schematic structure diagram of an SCP 1700 (e.g., SCP 30 as shown in FIGS. 10 and 11, as described previously) according to an exemplary embodiment of the present disclosure. The SCP 1700 in FIG. 17 may perform the method 900 for processing a service request described previously with reference to FIG. 9. Accordingly, some detailed description on the SCP 1900 may refer to the corresponding description of the method 900 for processing a service request as previously discussed.

As shown in FIG. 17, the SCP 1700 may include at least one controller or processor 1703 including e.g., any suitable CPU, microcontroller, DSP, etc., capable of executing computer program instructions. The computer program instructions may be stored in a memory 1705. The memory 1705 may be any combination of a RAM and a ROM. The memory may also comprise persistent storage, which, for example, can be any single one or combination of magnetic memory, optical memory, or solid state memory or even remotely mounted memory. The exemplary SCP 1700 further comprises a communication interface 1701 arranged for communication.

The instructions, when loaded from the memory 1705 and executed by the at least one processor 1703, may cause the SCP 1700 to perform the method 900 for processing a service request described previously with reference to FIG. 9.

In particular, in an exemplary embodiment of the present disclosure, the instructions, when loaded from the memory 1705 and executed by the at least one processor 1703, may cause the SCP 1700 to receive a request for a service from a first NF node; extract an API version from a Resource URI in the request; transmit to an NRF an NF discovery request for discovering a second NF node that provides the service without a limitation on the API version; and filter a second NF node that provides the service of the extracted API version from an NF discovery response from the NRF using the extracted API version.

In an exemplary embodiment of the present disclosure, the instructions, when loaded from the memory 1705 and executed by the at least one processor 1703, may cause the SCP 1700 to transmit the service request to the second NF node to process the service request, and in response, receive a response from the second NF node, which response will be transmitted to the first NF node.

By filtering the second NF node using an extracted API version, the possibility of successfully processing the service request is enhanced compared with the SCP randomly selecting an NF service producer from the NF discovery response from the NRF. Furthermore, if the first NF node constructs the service request with knowledge on the available API version, the possibility of successfully processing the service request is further enhanced, since the filtered second NF node just supports the API version selected by the first NF node. Certainly, the extracted API version may only indicate a major version. Accordingly, there may be cases that the full API version selected by the first NF node in constructing the service request may be NBC with the full API version supported by the NF node selected by the SCP since the minor versions of the two API versions are different. The embodiment at least addresses the NBC problem between major versions.

Other embodiments of the present disclosure are defined in the following numbered statements:

Statement 1. A method (700) at a first Network Function, NF, node for requesting a service with a Service Communication Proxy, SCP, in model D, comprising:

selecting (S710) an Application Program Interface, API, version for the service based on information on API versions for the service obtained by using a bootstrapping service and stored in the first NF node;

constructing (S720) a request for the service using the selected API version; and transmitting (S730) the request to the SCP.

Statement 2. The method of Statement 1, further comprising:

transmitting (S702) a bootstrapping request to a Network Function Repository Function, NRF, for bootstrapping information which comprises information on services and API versions supported by the services;

in response to transmitting the bootstrapping request, receiving (S704) from the NRF the bootstrapping information; and storing (S706) the information on services and API versions supported by the services.

Statement 3. The method of Statement 2, wherein the bootstrapping request is a dedicated bootstrapping request for obtaining the information on services and API versions supported by the services.

Statement 4. The method of Statement 1 or 2, wherein the information on services and API versions supported by the services further comprises information on NF nodes that support the API versions of the services.

Statement 5. The method of Statement 1 or 2, wherein the services and API versions supported by the services are global services and API versions supported by the services.

Statement 6. The method of Statement 1, further comprising:

receiving (S740) from the SCP a response indicating an error;

in response to the receiving of the response, reselecting (S710) a different API version for the service based on the information on API versions for the service;

constructing (S720) a different request for the service using the reselected API version; and transmitting (S730) the different request to the SCP.

Statement 7. The method of Statement 2, wherein transmitting a bootstrapping request to an NRF for bootstrapping information is performed at a power-on event at the first NF node, regularly, or in response to receiving a response indicating an error from the SCP.

Statement 8. A method (800) at a Network Function Repository Function, NRF, comprising:

receiving (S810) a bootstrapping request from a first Network Function, NF, node for bootstrapping information which comprises information on services and API versions supported by the services; and in response to receiving the bootstrapping request, transmitting (S820) to the first NF node the bootstrapping information.

Statement 9. The method of Statement 8, wherein the bootstrapping request is a dedicated bootstrapping request for obtaining the information on services and API versions supported by the services.

Statement 10. The method of Statement 8 or 9, wherein the information on services and API versions supported by the services further comprises information on NF nodes that support the API versions of the services.

Statement 11. The method of Statement 8 or 9, further comprising:

in response to receiving the bootstrapping request, collecting global services and API versions supported by the services from at least another NRF.

Statement 12. A method (900) at a Service Communication Proxy, SCP, in model D, comprising:

receiving (S910) a request for a service from a first Network Function, NF, node;

extracting (S920) an Application Program Interface, API, version from a Resource Uniform Resource Identifier, URI, in the request;

transmitting (S930) to a Network Function Repository Function, NRF, an NF discovery request for discovering a second NF node that provides the service without a limitation on the API version; and filtering (S940) a second NF node that provides the service of the extracted API version from an NF discovery response from the NRF using the extracted API version.

Statement 13. A first Network Function, NF, node (1300) for requesting a service with a Service Communication Proxy, SCP, in model D, comprising:

a communication interface (1301) arranged for communication, at least one processor (1303), and a memory (1305) comprising instructions which, when executed by the at least one processor, cause the first NF node (1300) to:

select an Application Program Interface, API, version for the service based on information on API versions for the service obtained by using a bootstrapping service and stored in the first NF node;

construct a request for the service using the selected API version; and transmit the request to the SCP.

Statement 14. The first NF node (1300) of Statement 13, wherein the instructions which, when executed by the at least one processor, further cause the first NF node to:

perform the method of any of Statements 2 to 7.

Statement 15. A Network Function Repository Function, NRF (1500), comprising:

a communication interface (1501) arranged for communication, at least one processor (1503), and a memory (1505) comprising instructions which, when executed by the at least one processor, cause the NRF (1500) to:

receive a bootstrapping request from a first Network Function, NF, node for bootstrapping information which comprises information on services and API versions supported by the services; and in response to receiving the bootstrapping request, transmit to the first NF node the bootstrapping information.

Statement 16. The NRF (1500) of Statement 15, wherein the instructions which, when executed by the at least one processor, further cause the NRF to:

perform the method of any of Statements 9 to 11.

Statement 17. A Service Communication Proxy, SCP (1700), in model D, comprising:

a communication interface (1701) arranged for communication, at least one processor (1703), and a memory (1705) comprising instructions which, when executed by the at least one processor, cause the SCP (1700) to:

receive a request for a service from a first Network Function, NF, node;

extract an Application Program Interface, API, version from a Resource Uniform Resource Identifier, URI, in the request, transmit to a Network Function Repository Function, NRF, an NF discovery request for discovering a second NF node that provides the service without a limitation on the API version; and filter a second NF node that provides the service of the extracted API version from an NF discovery response from the NRF using the extracted API version.

Statement 18. A computer readable storage medium having computer program instructions stored thereon, the computer program instructions, when executed by a processor in a network device, causing the network device to perform the method according to any of Statements 1-12.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the articles "a" and "an" are intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

The invention claimed is:

1. A method performed at a first network function (NF) node for requesting a service with a service communication proxy (SCP), the method comprising:

using a bootstrapping service to obtain information on API versions for the service;

selecting an application programming interface (API) for the service based on the information on the API versions for the service, wherein the API versions are supported by NF service producer nodes;

constructing a request for the service using the selected API version; and transmitting the request to the SCP, wherein using the bootstrapping service to obtain information on API versions for the service comprises:

transmitting to a network repository function (NRF) a bootstrapping request for bootstrapping information comprising information on services and API versions supported by the services; and after transmitting the bootstrapping request, receiving from the NRF a response responsive to the bootstrapping request, wherein the response comprises the bootstrapping information.

2. The method of claim 1, wherein the method further comprises storing the information on services and API versions supported by the services.

3. The method of claim 1, wherein the bootstrapping request is a dedicated bootstrapping request for obtaining the information on services and API versions supported by the services.

4. The method of claim 1, wherein the information on services and API versions supported by the services further comprises information on the NF service producer nodes that support the API versions.

5. The method of claim 1, wherein the services and API versions supported by the services are global services and API versions supported by the services.

6. The method of claim 1, further comprising:

receiving, from the SCP, a response indicating an error;

in response to the receiving of the response, reselecting a different API version for the service based on the information on API versions for the service;

constructing a different request for the service using the reselected API version; and transmitting the different request to the SCP.

7. The method of claim 1, wherein transmitting the bootstrapping request to the NRF for bootstrapping information is performed:

at a power-on event at the first NF node;

regularly; or in response to receiving a response indicating an error from the SCP.

8. A first network function (NF) node comprising:

memory; and processing circuitry, wherein the NF node is configured to perform the method of claim 1.

9. A non-transitory computer readable storage medium storing a computer program comprising instructions which, when executed by processing circuitry of a node, configures the node to perform the method of claim 1.

* * * * *